(12) United States Patent
Edwards et al.

(10) Patent No.: US 7,698,233 B1
(45) Date of Patent: Apr. 13, 2010

(54) SYSTEM AND METHOD FOR DETERMINING EXPECTED UNSERVED ENERGY TO QUANTIFY GENERATION RELIABILITY RISKS

(75) Inventors: Reed Edwards, Birmingham, AL (US); James Clyde McNeely, Sr., Alabaster, AL (US); Kevin Daniel Carden, Birmingham, AL (US); Vance Mullis, Alpharetta, GA (US)

(73) Assignee: Southern Company Services, Inc., Atlanta, GA (US)

( * ) Notice: Subject to any disclaimer, the term of this patent is extended or adjusted under 35 U.S.C. 154(b) by 383 days.

(21) Appl. No.: 11/626,002

(22) Filed: Jan. 23, 2007

(51) Int. Cl.
G06F 17/00 (2006.01)
G06F 17/30 (2006.01)
G05D 17/00 (2006.01)

(52) U.S. Cl. .......................... 705/412; 705/10; 700/291; 700/295

(58) Field of Classification Search .................. 700/291, 700/295, 297, 286, 287, 296; 703/18; 705/412, 705/7, 8, 9, 413, 30, 10, 29, 36 R, 26
See application file for complete search history.

(56) References Cited

U.S. PATENT DOCUMENTS

| | | | | |
|---|---|---|---|---|
| 4,023,043 | A * | 5/1977 | Stevenson | 307/38 |
| 5,479,358 | A | 12/1995 | Shimoda et al. | |
| 5,572,438 | A * | 11/1996 | Ehlers et al. | 700/295 |
| 5,798,939 | A * | 8/1998 | Ochoa et al. | 700/286 |
| 5,873,251 | A | 2/1999 | Iino | |
| 6,021,402 | A * | 2/2000 | Takriti | 705/412 |
| 6,472,774 | B1 * | 10/2002 | Bedouet | 307/31 |

(Continued)

FOREIGN PATENT DOCUMENTS

WO    WO 03/094414    11/2003

(Continued)

OTHER PUBLICATIONS

Ivey, "Consortium for Electric Reliability Technology Solutions, Grid of the Future White Paper on Accommodating Uncertainty in Planning and Operations," *Consortium for Electric Reliability Technology Solutions (CERTS)*, Dec. 1999.

(Continued)

*Primary Examiner*—Igor Borissov
(74) *Attorney, Agent, or Firm*—Womble Carlyle Sandridge & Rice, PLLC

(57) ABSTRACT

A method, system and program product for quantifying a risk of an expected unserved energy in an energy generation system using a digital simulation. An energy load demand forecast is generated based at least in part on a weather year model. A plurality of energy generation resources are committed to meet the energy load demand. An operating status is determined for each committed energy generation resource in the energy generation system. A determination is made as to whether or not the committed resources are sufficient to meet the energy load demand. A dispatch order for a plurality of additional energy resources is selected if the committed resources are not sufficient to meet the energy load demand. Additional resources are committed based on the selected dispatch order until the energy load demand is met. The expected unserved energy is determined and an equivalent amount of energy load demand is shed based at least in part on an expected duration of unserved energy and a customer class grouping. An associated cost for the expected unserved energy is also determined.

44 Claims, 15 Drawing Sheets

U.S. PATENT DOCUMENTS

| | | | |
|---|---|---|---|
| 6,735,596 | B2 | 5/2004 | Corynen |
| 6,876,948 | B1 | 4/2005 | Smith |
| 7,313,465 | B1 * | 12/2007 | O'Donnell .................. 700/291 |
| 7,343,360 | B1 * | 3/2008 | Ristanovic et al. .......... 705/412 |
| 7,516,106 | B2 * | 4/2009 | Ehlers et al. ................ 705/412 |
| 2002/0019758 | A1 * | 2/2002 | Scarpelli ........................ 705/7 |
| 2002/0194113 | A1 | 12/2002 | Lof et al. |
| 2004/0034584 | A1 * | 2/2004 | Cory et al. .................... 705/35 |
| 2004/0039622 | A1 | 2/2004 | Masiello et al. |
| 2004/0044442 | A1 | 3/2004 | Bayoumi et al. |
| 2004/0102872 | A1 | 5/2004 | Schick et al. |
| 2004/0215529 | A1 | 10/2004 | Foster et al. |
| 2004/0215545 | A1 | 10/2004 | Murakami et al. |
| 2004/0254686 | A1 | 12/2004 | Matsui et al. |
| 2005/0004858 | A1 | 1/2005 | Foster et al. |
| 2005/0033481 | A1 | 2/2005 | Budhraja et al. |
| 2006/0155423 | A1 * | 7/2006 | Budike, Jr. .................. 700/286 |
| 2007/0124026 | A1 * | 5/2007 | Troxell et al. ............... 700/291 |
| 2008/0177423 | A1 * | 7/2008 | Brickfield et al. ........... 700/291 |

FOREIGN PATENT DOCUMENTS

| | | |
|---|---|---|
| WO | WO 2004/055955 | 7/2004 |

OTHER PUBLICATIONS

Mittal, "Real Options Approach to Capacity Planning Under Uncertainty," *Masters' Thesis, Massachusetts Institute of Technology*, Feb. 2004.

* cited by examiner

FIG. 2

| General Information | | | | Load Adder (MW) | |
|---|---|---|---|---|---|
| Number of Northern Utilities | 1 | EUE Segment Size (MW) | 1000 | January | 2000 |
| Southern Utility Hydro Conversion(%) | 0.9 | Risk Aversion Threshold (%) | 0.85 | February | 2000 |
| Hydro Look Back (days) | 3 | Reliability Dispatch Threshold (%) | 0.95 | March | 2000 |
| EUE Payback Energy (%) | 50 | Reserve Reporting Threshold (MW) | 1000 | April | 2000 |
| Customer Hours per Outage Event | 0 | Dispatch Look Ahead (days) | 2 | May | 2000 |
| Threshold EUE Energy (MW) | 50 | Default EUE Cost ($/MWh) | 5500 | June | 2000 |
| Threshold EUE Events | 4 | TIE Assistance Cost ($/MWh) | 1500 | July | 2000 |
| Expected Summer Peak Load (MW) | 25000 | LOR Cost ($/MWh) | 500 | August | 2000 |
| LookAheadPeriod for Dispatch(Days) | 2 | | | September | 2000 |
| | | | | October | 2000 |
| | | | | November | 2000 |
| | | | | December | 2000 |

Operating Reserve Requirement: 1800 MW (○ % of Largest Unit / ● MW)

Spinning Reserves: 800 MW (○ % of Operating Reserve / ● MW)

Dispatch Emergency Capacity? ● Yes ○ No

Normal Dispatch Order
- Scheduled Hydro
- Pumped Storage
- Economy Purchase
- Combustion Turbine
- Curtailable 'C1'
- Curtailable 'C2'
- Curtailable 'C3'
- Curtailable 'C'
- Emergency Hydro
- Curtailable 'C4'

Reliability Dispatch Order
- Economy Purchase
- Combustion Turbine
- Curtailable 'C1'
- Pumped Storage
- Scheduled Hydro
- Curtailable 'C2'
- Curtailable 'C3'
- Curtailable 'C'
- Emergency Hydro
- Curtailable 'C4'

Risk-Aversion Dispatch ...
- Economy Purchase
- Pumped Storage
- Scheduled Hydro
- Combustion Turbine
- Curtailable 'C1'
- Curtailable 'C2'
- Curtailable 'C3'
- Curtailable 'C'
- Emergency Hydro
- Curtailable 'C4'

FIG. 3

| Groups | | | |
|---|---|---|---|
| UPS Group | UPS Group 1 | ▼ | View |
| Fuel Group | Base_Case | ▼ | View |

ViewUPSGroupForm

Unit Power Sales Description: UPS Group 1

Hourly Sales Data

| Unit | Year | Hourly Sales |
|---|---|---|
| 55 | 2005 | 104928 |
| 55 | 2006 | 514516 |
| 55 | 2007 | 618195 |
| 55 | 2008 | 774888 |
| 55 | 2009 | 897337 |
| 184 | 2005 | 685916 |
| 184 | 2006 | 2239776 |
| 184 | 2007 | 2483096 |
| 184 | 2008 | 2295524 |
| 184 | 2009 | 2482788 |
| 185 | 2005 | 679140 |
| 185 | 2006 | 2288132 |
| 185 | 2007 | 2482788 |
| 185 | 2008 | 1956416 |
| 185 | 2009 | 2483096 |
| 186 | 2005 | 690370 |
| 186 | 2006 | 2499220 |

Capacity Sales Data

| Unit | Month | Year | Capacity |
|---|---|---|---|
| 55 | 1 | 2005 | 213 |
| 184 | 1 | 2005 | 308 |
| 185 | 1 | 2005 | 308 |
| 186 | 1 | 2005 | 310 |
| 187 | 1 | 2005 | 310 |
| 208 | 1 | 2005 | 314 |
| 55 | 1 | 2006 | 248 |
| 184 | 1 | 2006 | 308 |
| 185 | 1 | 2006 | 308 |
| 186 | 1 | 2006 | 310 |
| 187 | 1 | 2006 | 310 |
| 208 | 1 | 2006 | 314 |
| 55 | 1 | 2007 | 248 |
| 184 | 1 | 2007 | 308 |
| 185 | 1 | 2007 | 308 |
| 186 | 1 | 2007 | 310 |
| 187 | 1 | 2007 | 310 |

FIG. 5

SYSTEM AND METHOD FOR DETERMINING EXPECTED UNSERVED ENERGY TO QUANTIFY GENERATION RELIABILITY RISKS

FIELD OF THE INVENTION

The present invention relates generally to energy generation planning systems and, more particularly, to methods and systems for determining expected unserved energy in order to quantify generation reliability risks.

BACKGROUND OF THE INVENTION

In planning for energy generation adequacy, determining the optimum level of energy reserves is difficult. If a utility maintains too low of a reserve margin, there is a high likelihood of being unable to serve the demands of all firm-load customers. If a utility maintains too high of a reserve margin, much money is wasted in building and maintaining capacity that is rarely used. A new digital simulation model is needed that can quantify the risk of occurrence of a wide-range of possible scenarios in terms of expected unserved energy (EUE) and expensive market purchases required to avoid shedding firm load customers. A wider range of components that contribute to unreliability need to be modeled than would be in an application that was designed for minimizing production cost.

Almost all reliability issues are expected to occur in the upper 10% of all possible weather, load forecast error, and hydro availability scenarios. In order to achieve statistical significance, a large number of cases need to be run in a simulation that realistically models energy generation and dispatch.

SUMMARY OF THE INVENTION

The invention is directed to a method, system, and program product for quantifying the potential generation reliability risks across a wide range of scenarios. A Monte Carlo frequency and duration model is used to determine expected unserved energy (EUE) and expensive reliability purchases. Historical and projected data concerning how often and for how long existing and future generating units fail provide the basis for estimating the expected number of firm load curtailments at various reserve levels.

All of the generating unit types have different data that are required to be input into the simulation model. Operational data includes distributions on outage history, capacities and operating levels, derating information, maintenance information, energy limitations, dispatch prices, and service dates. This data must be collected and correctly input into the simulation model.

The invention differentiates dispatch based on the ratio of demand to supply. This reflects actual operational efforts to conserve energy-limited resources during times of constraint. The digital simulation draws on historical distribution of outages by duration, rather than on an annual or seasonal forecast equivalent force outage rate (EFOR) for each unit. This produces a more accurate reflection of cumulative megawatts forced offline during constrained periods. The digital simulation provides the ability to process hundreds of thousands of iterations of an entire year in a matter of hours. Furthermore, the digital simulation includes dynamic market simulation based on supply/demand, dynamic hydro-operation based on market simulation and hydro-availability, and representation of transmission constraints without load flow modeling to allow for fast processing. Other features include dispatching supplemental modes of operation for combined cycles, and modeling of capacity reduction based on weather.

In one aspect of the invention, a method, system, and computer program product are provided for quantifying a risk of expected unserved energy in an energy generation system using a computer simulation. An energy load demand forecast is generated based at least in part on a weather year model. A plurality of energy generation resources is committed to meet the energy load demand. An operating status is determined for each committed energy generation resource in the energy generation system. A determination is made as to whether or not the committed resources are sufficient to meet the energy load demand. A dispatch order for a plurality of additional energy resources is selected if the committed resources are not sufficient to meet the energy load demand. Additional resources are committed based on the selected dispatch order until the energy load demand is met. The expected unserved energy is determined and an equivalent amount of energy load demand is shed based at least in part on an expected duration of unserved energy and a customer class grouping. The computer program product implements the method for simulating deployment of a plurality of energy resources in an energy generation system to minimize an expected unserved energy. The system includes a processor executing a plurality of software components for performing the steps of the method.

BRIEF DESCRIPTION OF THE DRAWINGS

These and other advantages and aspects of the present invention will become apparent and more readily appreciated from the following detailed description of the invention taken in conjunction with the accompanying drawings, as follows.

FIG. 2 illustrates the selected units tab user interface in an exemplary embodiment.

FIG. 3 illustrates the control variables tab user interface in an exemplary embodiment.

FIG. 5 illustrates the input groups tab user interface in an exemplary embodiment.

DETAILED DESCRIPTION OF THE INVENTION

Figure 1:
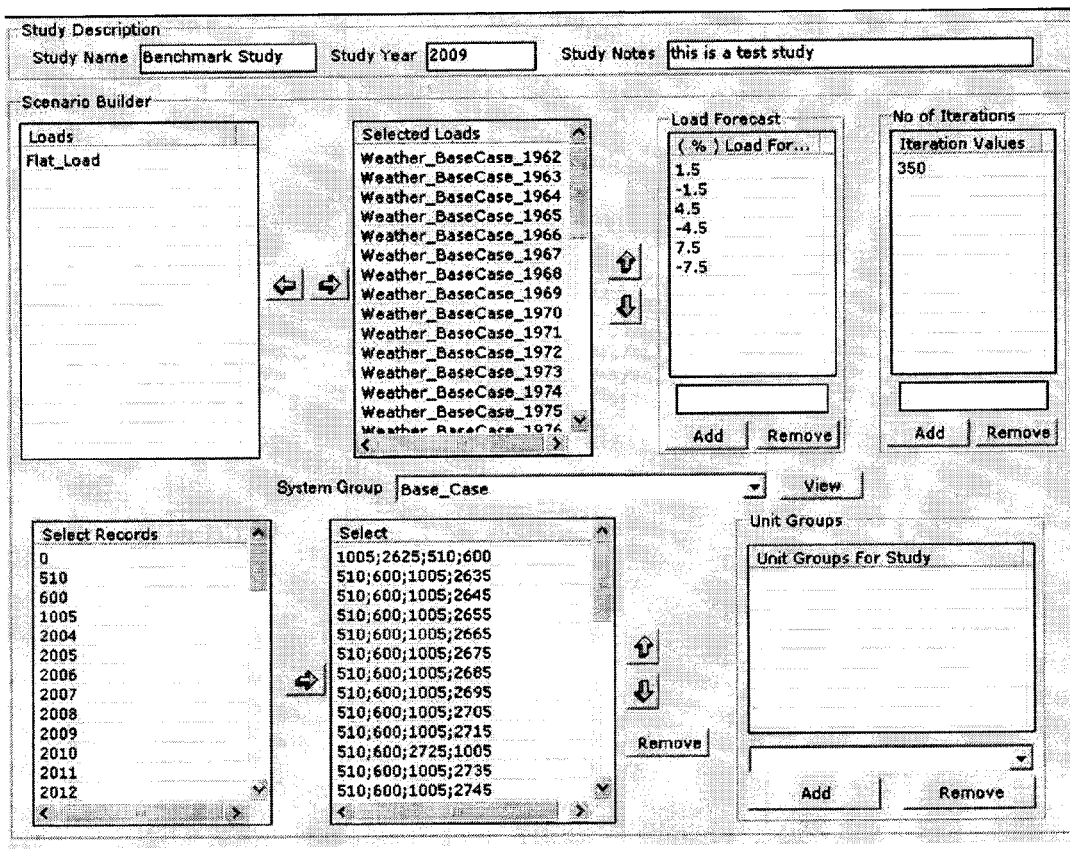
FIG. 1 illustrates a scenario builder tab user interface for creating a scenario in an exemplary embodiment.

The following description of the invention is provided as an enabling teaching of the invention and its best, currently known embodiment. Those skilled in the art will recognize that many changes can be made to the embodiments described while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations of the invention are possible and may even be desirable in certain circumstances and are part of the present invention. Thus, the following description is provided as illustrative of the principles of the invention and not in limitation thereof since the scope of the present invention is defined by the claims.

In an embodiment of the invention, the capabilities of an energy generation system during peak load conditions are modeled and analyzed. The modeling and analysis provide insight into the risks and costs during these periods as well as the value of being able to meet peak load conditions. The results of the analysis can be used to assist the planner in evaluating the worth of demand-side options and energy-limited resources with various constraints. Generation reliability determinations can help to mitigate the risks involved as described herein.

The following definitions of terms used in this description are provided for ease of reference by the reader:

Availability Factor (AF)—[available hours/period hours]×100(%)

Available—This is the state in which a unit is capable of providing service, whether or not it is actually in service, regardless of the capacity level that can be provided.

Available Hours—(a) sum of all service hours, reserve shutdown hours, pumping hours, and synchronous condensing hours, or; (b) period hours (PH) less planned outage hours, forced outage hours, and maintenance outage hours.

Demand-side Options (DSOs)—Demand-side options are ways that the utility can reduce demand in order to avoid unserved energy. When load is going to be greater than capacity, the options are to increase capacity or reduce load. By calling a non-firm large industrial customer to reduce load or automatically switching off a large block of residential cooling units on demand-side programs, the utility can control demand.

Economy Purchases—In many hours, there is excess capacity in the market that is below the cost of the incremental unit. This is estimated by using the economy purchase input data to simulate the availability of economy purchases.

Equivalent Forced Derated Hours—The product of the forced derated hours and the size of reduction, divided by the net maximum capacity.

Equivalent Forced Outage Rate (EFOR)—[(forced outage hours+equivalent forced derated hours)/(forced outage hours+service hours+equivalent forced derated hours)]×100(%)

Expected unserved energy (EUE)—This is the amount of firm load that is estimated to be shed in a given hour.

Forced Derated Hours—Sum of all hours experienced during forced deratings.

Forced Derating—An unplanned component failure (immediate, delayed, postponed) or other condition that requires the load on the unit be reduced immediately or before the next weekend.

Forced Outage—An unplanned component failure (immediate, delayed, postponed, startup failure) or other condition that requires the unit be removed from service immediately or before the next weekend.

Forced Outage Factor (FOF)—[forced outage hours/period hours]×100(%)

Forced Outage Hours—Sum of all hours experienced during forced outages.

Forced Outage Rate (FOR)—[forced outage hours/(forced outage hours+service hours)]×100(%)

Generation Reliability—Generation reliability is the ability of the utility system to be able to meet firm load obligations irrespective of internal transmission constraints.

Load Forecast Error (LFE)—Load Forecast Error is based on the error in estimating the non-weather related growth in the load from year to year. It is primarily economic growth that is estimated in this component. This distribution can be estimated using historical projections of load compared to actual weather-normalized peak loads.

Loss of load hours (LOLH)—This is the duration in hours over which there is unserved energy.

Loss of load probability (LOLP)—This is the probability of an EUE event occurring in a given hour. It is the number of iterations with EUE in a given hour divided by the total number of iterations.

Maintenance Derated Hours—Sum of all hours experienced during maintenance deratings and scheduled derating extensions of any maintenance deratings.

Maintenance Derating—The removal of a component for scheduled repairs that can be deferred beyond the end of the next weekend, but requires a reduction of capacity before the next planned outage.

Maintenance Outage—The removal of a unit from service to perform work on specific components that can be deferred beyond the end of the next weekend, but requires that the unit be removed from service before the next planned outage. Typically, a maintenance outage may occur anytime during the year, have flexible start dates, and may or may not have a predetermined duration.

Maintenance Outage Hours—Sum of all hours experienced during maintenance outages and scheduled outage extensions of any maintenance outages.

Net Capacity Factor (NCF)—[net actual generation/(period hours×net maximum capacity)]×100(%)

Normal Weather—Normal weather is the weather that would be expected to result in the highest load during a year and reflects a 50% probability that the weather would be more severe and a 50% probability that the weather would be less severe.

Peak Load—Peak load is the highest load for the year. When forecasting the peak load, it is done using the weather-normalized peak load.

Period Hours—Number of hours a unit was in the active state.

Planned Derated Hours—Sum of all hours experienced during planned deratings and scheduled derating extensions of any planned deratings.

Planned Derating—The removal of a component for repairs that is scheduled well in advance and has a predetermined duration.

Planned Outage—The removal of a unit from service to perform work on specific components that is scheduled well in advance and has a predetermined duration (e.g., annual overhaul, inspections, testing).

Planned Outage Hours—Sum of all hours experienced during planned outages and scheduled outage extensions of any planned outages.

Planning Reserve Margin—This is calculated as (expected peak capacity/expected peak load)−1.

Quick Start Reserves—These are generally combustion turbine units that can be ramped up in 15 minutes.

Reserve Margin—A measure of available capacity over and above the capacity needed to meet normal peak demand levels. For a producer of energy, it refers to the capacity of a producer to generate more energy than the system normally requires. For a transmission company, it refers to the capacity of the transmission infrastructure to handle additional energy transport if demand levels rise beyond expected peak levels. Regulatory bodies usually require producers and transmission facilities to maintain a constant reserve margin of 10-20% of normal capacity as insurance against breakdowns in part of the system or sudden increases in energy demand.

Reserve Shutdown—A state in which a unit is available but not in service for economic reasons.

Reserve Shutdown Hours—Sum of all hours experienced during reserve shutdowns (RS). Some classes of units, such as gas turbines, are not required to report reserve shutdown (RS) events. Reserve shutdown hours for these units may be computed by subtracting the reported service hours, pumping hours, synchronous condensing hours, and all the outage hours from the period hours.

Scheduled Derated Hours—Sum of all hours experienced during planned deratings, maintenance deratings and scheduled derating extensions of any maintenance deratings and planned deratings.

Scheduled Deratings—Scheduled deratings are a combination of maintenance and planned deratings.

Scheduled Outage Factor (SOF)—[scheduled outage hours/period hours]×100(%)

Scheduled Outage Hours—Sum of all hours experienced during planned outages, maintenance outages, and scheduled outage extensions of any maintenance outages and planned outages.

Scheduled Outages—Scheduled outages are a combination of maintenance and planned outages.

Service Factor (SF)—service hours/period hours×100(%)

Service Hours—Total number of hours a unit was electrically connected to the system.

Spinning Reserves—A portion of the North American Electric Reliability Council (NERC) required operating reserves must be spinning, meaning that the unit is online but has excess unused capacity that can be accessed quickly.

Unavailable—State in which a unit is not capable of operation because of the failure of a component, external restriction, testing, work being performed, or some adverse condition.

Unavailable Hours—Sum of all forced outage hours, maintenance outage hours, and planned outage hours.

Unplanned Derated Hours—Sum of all hours experienced during forced deratings, maintenance deratings, and scheduled derating extensions of any maintenance deratings.

Unplanned Outage Hours—Sum of all hours experienced during forced outages, maintenance outages, and scheduled outage extensions of any maintenance outages.

A Monte Carlo digital simulation quantifies the risk of expected unserved energy (EUE) and the expense of market purchases required to avoid shedding firm-load customers across a wide range of possible scenarios. Unique structure and processing of input and output data enables the digital simulation to consider not only a large number of components that contribute to unreliability, but to process a large number of scenarios quickly. With a large population size, decisions can be made on relative risks between months, hours of the day, weather impacts, unit outage impacts and load forecast errors.

Generating units (e.g., combustion turbines, combined cycle units) typically operate for a period of time, fail and are repaired, and then operate again. Monte Carlo draws on each generating unit's historical operating performance are used in the invention to determine expected forced outages. Steam units are typically more reliable during the high load seasons (summer for summer peaking utilities and winter for winter peaking utilities) probably because of the emphasis on keeping the units running due to the increased demand. Since the forced outage data includes only a series of observations, multipliers are used to move the data to more realistic values to better reflect annual patterns of reliability. Typical actual data for a generating unit could have 8-12 entries in the time to failure (TTF) input data record ranging from a few hours to several thousand hours. The corresponding entries in the time to repair (TTR) input data record could range from a few hours to many. In one embodiment, the simulation will randomly select time to failure from the first data record and then select a random time to repair duration. Individual unit operation thus reflects historical data over a selected time period for which data is available. Since generating units are independent, multiple units can be down (i.e., failed) concurrently.

Generating units also periodically experience equipment failures that require the units to operate at reduced output. These partial outages are generally much less significant than full forced outages, but must still be considered when determining system generation reliability. Generating units have been found to have slightly lower reliability in the summer months in terms of partial outages. Partial outages occur more frequently and are repaired more quickly in the summer. The difference may be due to fewer reporting of partial deratings in non-summer months since the units are not called on for economic dispatch during that period. The higher level of partial outages is representative of periods when unserved energy will occur.

Three data inputs are used to model partial outages for each system generating unit. These inputs are mean time to failure (MTTF), mean time to repair (MTTR) and percent derating. The invention randomly simulates partial outages based on unit service hours, MTTF and MTTR. Partial outages are represented as constants in the model, rather than as a distribution, because of their relatively small effect within the analyses.

The determination of the reliability impact of conventional hydroelectric "hydro" generation is one of the major reasons for developing a Monte Carlo-based model for system simulation. The operation and flexibility of conventional hydro generation is very complex to model. A system-owned hydro generation capacity can be divided into three components: (1) run-of-river (ROR), (2) scheduled hydro generation, and (3) emergency or "unloaded" hydro generation. Multiple hydro generation scenarios matched with multiple weather scenarios are included in the simulation model. For each scenario, ROR and scheduled hydro generation are modeled based on actual historical results. ROR capacity operates in every hour, and varies in each weather year and with each month. Emergency hydro generation is modeled as a variable amount of system hydro generation capacity that changes based on the availability of peak hydro from year to year and month to month.

The major constraint in dispatching emergency hydro generation involves the assumptions concerning how willing dispatchers are to hold back the emergency hydro generation. The simulation model calculates the emergency hydro energy available in each day due to natural in-flow. The simulation model also looks back several days (e.g., three) to see if some of the natural in-flow was not used in that period. The daily hydro limit is the sum of today's natural in-flow and any energy not used in the several preceding days. For a series of capacity-constrained days, only the normal in-flow energy will be available near the end of the series each day. This modeling approach results in much higher, but more accurate EUE projections than the traditional production cost approach of simply adjusting loads for hydro operation.

The pumped hydro storage units are dispatched in reliability order, i.e., units with larger ponds are dispatched first. Pumping should and will occur any time energy is available. In keeping with the goal of calculating EUE, there are no economic tests associated with pumped storage hydro operation. Alternatively, it could be viewed that it is always economical to build up the reservoirs of storage units with any generating asset available if that is what is required to have a unit available to operate to avoid unserved energy.

Load data is input into the simulation model as the sum of the hourly loads for the entire system being modeled. Temperatures should be input with the hourly loads; for systems that span a wider geographical area, the temperatures for different geographical areas should be weighted by the load in different geographical areas to develop a composite temperature.

Load management capacity is also included in the simulation analysis. The load management resources include such programs as interruptible service, real-time pricing, direct load control, stand-by generation, excess generation, and supplemental energy. The digital simulation includes the physical constraints (e.g., hours per year, days per week, and hours per day) for these energy-limited resources. These resources occupy specific positions in the dispatch order. The position in dispatch affects the ability of these resources to reduce expected unserved energy and alters the frequency with which they are called.

Various load management rates, sometimes referred to as active demand-side options (active DSOs), such as interruptible load, cool storage, and direct load control have gained interest by electric utilities over several decades. The interruptible load is handled explicitly in the simulation analysis, but DSOs that cannot be dispatched (passive DSOs) are included in the load forecasts and are more difficult to identify discretely.

If inexpensive energy is available from neighbors, dispatchers will hold back on hydro and pumped storage, and buy economy energy. By examining historical load shapes, estimates of available economy energy can be developed.

The unpredictability of weather also impacts system generation reliability. Historical weather patterns for a large number of consecutive years and their associated probabilities of occurrence are utilized in the simulation model. In general, if weather remains normal over time, concerns for system generation reliability are minimized. However, if a system experiences many days of recording abnormal temperatures, system demand would increase significantly.

The capacity of some fossil and combustion turbines changes based on the ambient air temperature. With each load file a temperature is specified for each hour. In the unit input section, a multiplier is specified for each temperature. During the simulation, the multiplier is used to calculate the hourly capacity for each unit that is online.

System dispatchers have flexibility regarding the order in which generating units are called to operate. Steam units are committed first, generally beginning with the least expensive in terms of operating costs. When steam units are insufficient or are not the most economical way to meet the electrical demand, the system dispatchers can call on a combination of the following options: economy purchases, normally scheduled hydro, pumped storage hydro, combustion turbines, load management, and emergency hydro. The combination and the order of the options called varies with system conditions and projections of the near future, usually the next two or three days. During most periods of the year, the dispatch order is as follows: (1) all steam units; (2) scheduled hydro; (3) pumped storage; (4) economy ties if available; (5) combustion turbines; (6) load management; and (7) emergency hydro.

If system conditions are tighter than normal, the pumped storage units could be run before the conventional hydro. If system conditions are even tighter, the combustion turbines can be called before the conventional and pumped hydro. To reflect these options, the simulation model checks the next two days to estimate how tight the system capacity situation is expected to be. If the system peak is expected to be between 85% and 95% of available capacity, including all committed hydro and quick start units, the dispatch order is revised to move the pumped storage units down in the dispatch order. The order of dispatch then becomes: (1) all steam units, (2) economy ties if available, (3) pumped storage, (4) scheduled hydro, (5) combustion turbines, (6) load management, and (7) emergency hydro.

If the system peak is expected to be above 95% of available capacity, the dispatch order is changed to the generation reliability dispatch. The order of dispatch then becomes: (1) all steam units, (2) economy ties if available, (3) combustion turbines, (4) pumped storage, (5) scheduled hydro, (6) load management, and (7) emergency hydro. Since the simulation model switches dispatch orders dynamically over time, this feature is called the "dynamic dispatching option." Thresholds and dispatch order may vary from system to system and can be accounted for in the model.

The cost of EUE is one of the most important and most uncertain of the assumptions in the simulation model. The payment that a customer is willing to make to avoid an hour of sudden, unexpected firm load curtailment on a hot summer afternoon is difficult to estimate. The payment that a customer is willing to take to suffer an hour of sudden, unexpected firm load curtailment on a hot summer afternoon is also difficult to estimate. Whenever EUE is incurred, an estimated societal cost is applied to that energy. This cost is based on surveys and estimates of the impact that unserved energy has on customers. The invention models the cost of EUE based on the duration of load shed events.

Scenario Builder

FIG. 1 illustrates a scenario builder tab user interface for creating a scenario. Study data also controls the scenarios that are run for each study. There are four primary inputs on the scenario builder tab that are used to build the studies: load files, system records, number of iterations, and load forecast error. Each load file is the representation of a weather year. The load files are input in the load section, but on the scenario builder tab, the user points to which specific load file to use as well as in which order. The system records are the year identifier in the system data. The user has flexibility to specify different system data for each year. The user can then specify which year to use by selecting an individual or combination of records on this tab. The selection process requires first selecting the system group. Then all the possible records are auto populated in the left list box. The user then selects up to five records for each line. The number of iterations controls how many times the simulation will occur for each scenario. A larger number of iterations will result in a more convergent result. The load forecast error is an estimation of the distribution of errors from forecasting the weather normalized peak load. The probabilities that go with this distribution are used on the control tab. Load forecast error is based on the error in estimating the non-weather related growth in the load from year to year. It is primarily economic growth that is estimated in this component. Using historical projections of load compared to actual weather-normalized peak loads, this distribution can be estimated.

Each combination of scenarios will correspond to a case number on the control tab. To select the correct cases, it is often too time consuming to search through up to 10,000 cases to find the correct combination. Default cases can be set in a csv file and imported into the application to facilitate easy selection. The case numbers are calculated by taking the scenario building variables in alphabetic order and calculating all the combinations.

Selected Units

Figure 2:
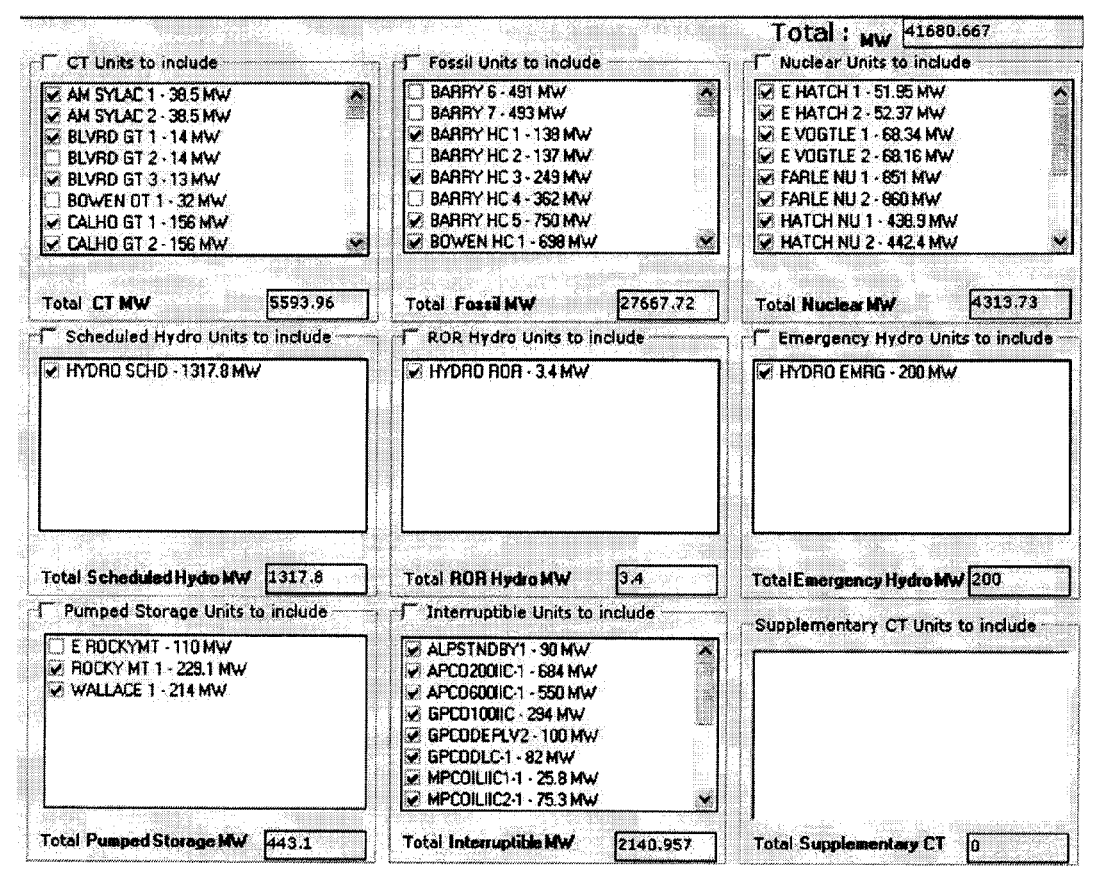

FIG. 2 illustrates the selected units tab user interface. The first step on this tab is to select the unit group that will be used. The different unit types that can be selected include nuclear, fossil steam, combustion turbine, interruptible units, emergency hydro, scheduled hydro, run of river hydro, and pumped storage hydro. After selecting the unit group, all the possible units will be loaded into the respective unit types. The user is then able to check all the units that he wants to include for the study. The summary control objects keep a running total of the capacity that has been selected. Note that only units that have global values for capacity can be accurately summarized. If a unit's capacity is input seasonally or has a varying capacity based on weather, an accurate total will not be calculated. Units that do not have global capacity values are highlighted.

Unit information can be input in multiple different formats including global, annual, monthly, seasonal, global monthly, and global seasonal. Unit variables include, but are not limited to, the following: unit peak hour rating; unit continuous hour rating; unit capacity levels, curtailable days per week limit, curtailable hours per day limit, curtailable hours per year limit, unit fixed cost, unit fuel handling cost, unit variable operations and maintenance cost, pumped storage hydro cycle efficiency; unit dispatch type; unit primary fuel number; unit heat rate coefficients; unit incremental heat rates; hydro unit monthly energy; unit in-service dates; curtailable minimum down time; unit maintenance period start, end dates; unit dispatch penalty factor; unit partial outage derating percentage; unit partial outage time to failure; unit partial outage time to repair; pumped storage hydro pond capacity (MWHr); combustion turbine start up probability; steam unit startup time (Hrs); unit time to failure cumulative probability distribution (hours); unit time to failure hourly distribution; unit time to failure multiplier; unit time to failure probability; unit time to failure reference; unit time to repair probability distribution (hours); unit time to repair probability distribution (days); unit time to repair hourly distribution; unit time to repair multiplier; unit time to repair probability; and unit time to repair reference.

Control Variables

FIG. 3 illustrates the control variables tab user interface. The control variables in the simulation model include, but are not limited to the following: (1) combustion turbine (MW) counted toward spinning reserves; (2) combustion turbine percentage counted toward spinning reserves; (3) dispatch unit emergency rating; (4) dispatch unit maximum rating; (5) dispatcher's peak estimate look ahead (days); (6) dispatch type calculation look ahead (days); (7) hydro look back period (days); (8) load adder (MW); (9) normal dispatch order; (10) risk-aversion dispatch order; (11) reliability dispatch order; (12) study year; (13) normal risk—aversion dispatch threshold; and (14) risk aversion—reliability dispatch threshold.

System Variables

System variables include, but are not limited to, the following: minimum area security requirement (MW); daily peak estimate error distribution; economy purchases by month, hour; fuel cost; hydro hours of operation limitation; neighbor tieline import limit (MW); amount for reserves (MW); reserves as percentage of largest unit; segment size (MW) of energy distributions; and sub-period definition. Every hour of the week needs to fall into one of three sub-periods: weekday, weeknight, or weekend.

Reports

Figure 4:
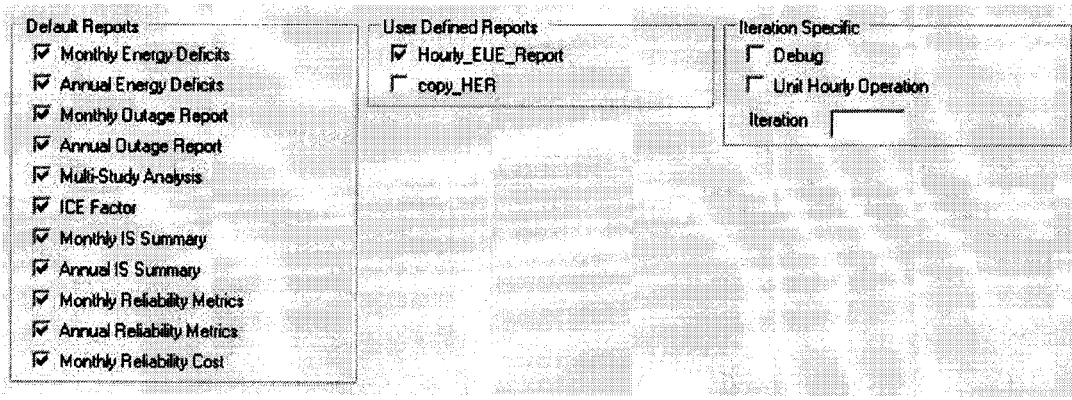
FIG. 4 illustrates the reports tab user interface in an exemplary embodiment.

FIG. 4 illustrates the reports tab user interface. There are three categories of reports illustrated in the figure: standard reports, customized reports, and iteration-specific reports. Iteration-specific and standard reports cannot be modified by the user. The user must specify the iteration for which the reports should be generated on the iteration-specific reports. These reports are not generally used in the outcome of the study, but are rather used for debugging the simulation to validate different components of the input data or the simulation process.

The standard reports that are visible in the reporting section are based on the reports selected in the data inputs in the study section. The study must be opened to be able to view the reports. The standard reports that can be selected include monthly energy deficits; annual energy deficits; monthly outage report; annual outage report; multi-study analysis (for certain analyses, reliability costs need to be summarized across all the cases for a study); incremental capacity equivalent (ICE) factor; monthly interruptible service (IS) summary; annual IS summary; monthly reliability metrics; annual reliability metrics; monthly reliability cost; debug report; and unit hourly operation.

To evaluate the worth of energy-limited resources, the simulation model tracks the "generation" from the demand-side options. The IS report will give the hours and generation for each of the curtailable units. The monthly reliability metrics report contains many of the industry standard reliability variables such as LOLP and LOLH.

The monthly reliability cost report contains 24 points for the peak day of each month, the sum of all the weekdays, and the sum of all the weekends. Each of the points represents the percentage of all the reliability costs that fell in the corresponding hours for the entire study. It is summed across all scenarios and weighted according to the case probability. The sum of all 72 points for the month represents the monthly capacity worth factors.

The debug report is primarily used to ensure that the simulation is progressing according to expectations. The debug report contains hourly loads, fossil capacity, combustion turbine capacity, interruptible service generation, scheduled hydro generation, emergency hydro generation, emergency purchases, economy purchases, pumped storage generation, and the capacity offline.

The unit hourly operation report outputs for every hour, the operating state of each unit.

This report is typically used for debugging.

Input Groups

FIG. 5 illustrates the input groups tab user interface. The user selects Unit Power Sales (UPS) groups and fuel groups using this interface.

UPS data represent portions of units that are sold. Typically these are sold as blocks but in many hours the entire capacity is not used. Therefore monthly capacities and hourly energy are used to calculate the amount of capacity available. When a unit, which has a portion of its capacity sold, is forced offline, the sales from that unit should be curtailed. If the sale energy in any hour is less than the capacity of the sale, the remaining capacity will be available to the system to meet its load. The UPS sales can vary from study to study, so the data is input in UPS groups. Each UPS sale must have a monthly capacity that corresponds to a unit and a month. Each sale must also have 8760 data points for the sale, i.e., a data point for each hour of the year.

Each unit should have a fuel assigned to it. This information is primarily for setting the dispatch order. The fuel prices can vary from study to study, so the data is input in fuel groups. Each fuel file must have the referenced unit's identifier as well as a month and year to go with the fuel cost.

Input Validation

Input validation information is stored for each case that is run in a study. Much of the data will be the same between cases in a study, but may change drastically depending on the select records that are used. There are five sections in the input validation information: error report, maintenance report, outage report, resources report, and load report. There are three sections in the error report—a note section, a warning section, and an error section. Only an error will stop the simulation. The maintenance report is a summary of all the maintenance information input into the application. The outage report is also a summary of the outage information. This helps to ensure that what was intended is what is actually being used in the study. The resources report summarizes all the units that are being used in the report. The resources are summed by month and by capacity type. This also helps to show changes in capacity based on selected values that are input into the application. For example, if a unit has a global value, but also different monthly values for a certain year, and the year is currently selected, the logic is going to select the correct values. The load report summarizes the load for each month by calculating the peak load, the sum of all the loads. This report is done after the adjustments have been calculated, so the user can see how the load forecast multiplier and load adder and hydro information have affected the loads.

Hydro Dispatch

In one embodiment of the frequency and duration model, aggressive assumptions are made regarding the availability of hydro resources and the willingness of dispatchers to dispatch hydro during peak conditions. In general, hydro will be dispatched more equitably throughout the week than has been assumed in the more aggressive reliability model. Also, because of the difference between storage projects and run-of-river projects, capacity may be available at some units when it is unavailable at other units.

To implement more conservative dispatch assumptions, the logic for scheduled hydro can be modified. Scheduled hydro represents the normal monthly dispatch capacity for a hydro unit, and will be dispatched a week ahead in the conservative dispatch embodiment. Emergency hydro represents the capacity for the hydro unit if there is no other alternative besides EUE.

Steps performed by the processing logic of the conservative dispatch embodiment to dispatch hydro are as follows:

1. Take the load array and weekly dispatcher's peak error and multiply times loads;
2. Schedule minimum MWHrs per day across the peak (scheduled around the expected daily peak);
3. Sort these new loads;
4. Until the dispatched hydro energy is greater than the input energy available per week, increment the dispatched hydro capacity to shave peak loads such that the peak hours have the same load;
5. If the dispatch order reaches emergency hydro and load is still greater than committed capacity, dispatch additional hydro up to emergency capacity;
6. Apply hydro look-back logic only to emergency hydro dispatch.

The water level in the hydro storage projects changes from season to season. A rule curve has been established that identifies the range of water levels with which projects can operate. The frequency and duration model does not assume that it is possible to go below the rule curve on any of the projects. To determine the amount of energy available for emergency hydro during a season, an assumption is made that hydro is generally operated at least a small amount above the bottom of the rule curve. The available energy due to this difference and its impact on other hydro units in the same river system is calculated. This available energy is spread over the summer season. If the total emergency hydro energy for the summer season is 50,000 MWh, then each day would receive approximately 500 MWh. Hydro look-back logic is used in dispatching emergency hydro in the simulation model.

The following points summarize the processing logic for dispatching hydro in the conservative dispatch embodiment:

1. Scheduled hydro is dispatched a week ahead to shave the peaks. The capacity is set by the analyst for each year. The energy to be scheduled is the historical energy for the year being modeled.
2. Emergency hydro represents the difference between the scheduled hydro capacity and the declared capacity for hydro. Emergency hydro will be dispatched hourly as needed with seasonal energy limits.

Dispatching Supplemental Modes of Combined Cycles

Because the frequency and duration model is not attempting to minimize production cost, incorporating logic for the different modes of combined cycles is not very difficult. However, there are some complicating factors. Because the supplemental modes cannot operate unless the base mode is operating, additional units will be created to represent the supplemental modes. These additional units will then be linked to the base mode using a new variable. Only in hours when the base mode unit's status is operating, are the supplemental modes capable of being dispatched. The supplemental modes will be modeled as combustion turbine units. Another issue is that power augmentation will not be able to operate at temperatures below 60 degrees F., so the impact of dispatching these supplemental modes has to be taken into consideration in the weather/capacity logic.

Dispatching Interruptible Contracts

All interruptible contracts must be included in a block loading group. When interruptible contracts are called, they are called in groups to ensure equality among such contracts. Each curtailable unit is assigned a block loading group.

In actual utility operation, interruptible contracts are called in a rotating manner to ensure equality. Therefore, all available interruptible contracts are sorted in descending order of the time since that contract's previous call.

Market Purchases

The true cost of reliability is not only the cost of EUE, but also the incremental cost of market purchases beyond the production cost of a combustion turbine. In the frequency and duration model, there are three components factored into making market purchases: (1) market price, (2) available generating capacity, and (3) available transmission capacity.

Some of the factors that affect market price are the following: resources—total load; time of day; day of week; alternatives (seller, buyer); elasticity of demand; previous day's market price; natural gas availability; seasonal market price; coal availability; hydro reserves; transmission availability; and weather expectations. The market price should only represent the incremental price above the cost of a combustion turbine.

The impact of these factors can generally be estimated through two variables: (1) the expected reserve margin for the year and (2) the magnitude of the hourly difference between available resources and load. In other words, estimated cost of market purchases are based on the planning reserve margin, and the hourly shortage of capacity. The market purchase cost data should be input with a reserve margin (RM) and corresponding shortage level with the cost. This must be provided for a sufficient number of data points such that a reasonable estimation can be made.

Figure 6:
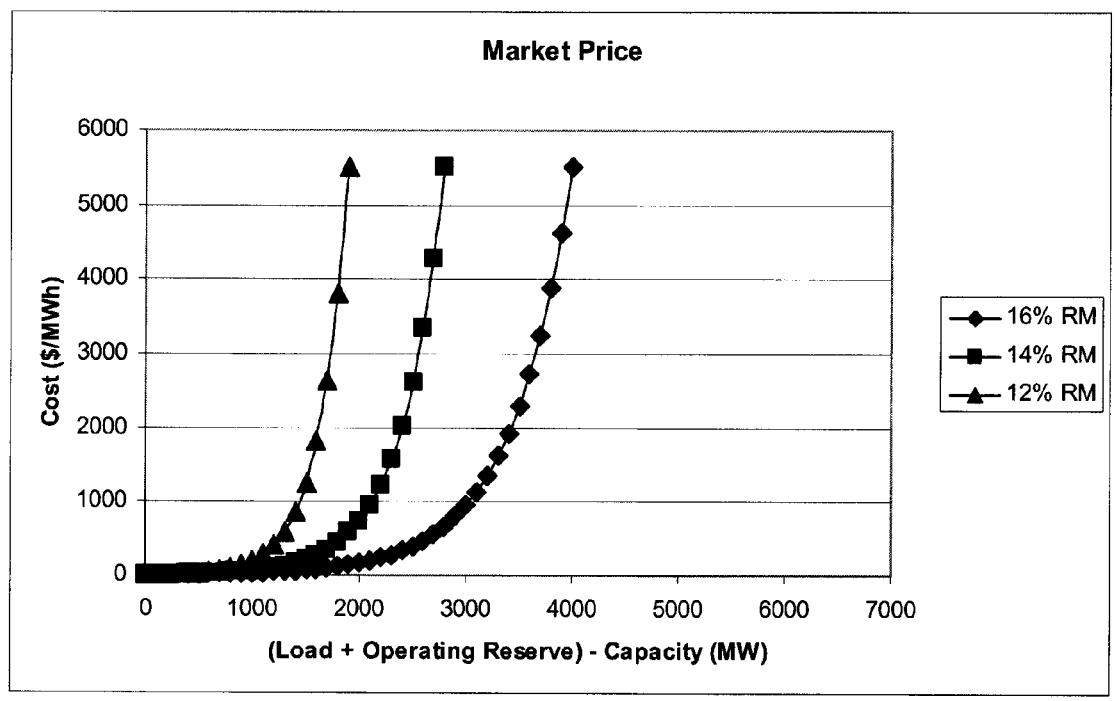
FIG. 6 illustrates an exemplary chart for determining the market price.

FIG. 6 illustrates an exemplary chart for determining the market price. For example, consider the following variable values and the "short" cost data array in Table 1 below:

Hr: 4409
Expected Summer Peak Capacity=30,000 MW
Short: 110 MW
RM: 15.9%
RM=(1+LFE)*Calculated Summer Capacity/Expected Summer Peak Load

TABLE 1

| Short | RM | Cost |
|---|---|---|
| 100 MWh | 16% | $200/MWh |
| 150 MWh | 16% | $300/MWh |

Because the cost and reserve margin are inversely proportional, an adjustment is required on the position in the cost array for 15.9% reserve margin case. The adjustment is based on the proximity to the nearest point in the short cost array. This adjustment calculation is as follows:

adjustment=(16%−15.9%)*ExpectedSummerPeakCapacity=0.1%*30,000=30 MW

The simulation model interpolates between the 100 MWh and 150 MWh points in the short cost table:

Short + adjustment = 110 + 30 = 140MW;

$$\frac{(140-100)}{150-100}*(300-200)+200 = \$280/MWh$$

After the market price is determined, the actual energy available for purchasing must be determined. Each of the interfaces from which an electric utility can purchase energy could be modeled in the frequency and duration model. The first factors to determine capacity available are the total resources and projected reserve margin for the control areas on the interface.

Monthly transfer capacity data is input as a distribution for each neighbor for each month. It is important that each neighbor has points in the distribution that correspond to each other. This is done through the position variable in the input data. Position one in neighbor one must correspond to position one from all the other neighbors. For example, if position one for neighbor one came from the 33rd hour in July, position one for all other neighbors should come from the same hour. Several inputs are required to model neighboring utilities correctly. These include EFOR, number of units, capacity, peak load, and capacity benefit margin (CBM).

For each hour that energy is needed from outside the electric utility's control area, the following calculation is performed for each interface:

$$AvailableCapacity = \\ Neighbor\_Capacity - \left(\frac{NativeLoad}{ExpectedPeakLoad}\right)*Neighbor\_Load - \\ random(CumulativeMWOfflineDistribution) - Neighbor\_EnergyLimited\ Resources$$

Neighbor_EnergyLimitedResources will be removed from Neighbor_Capacity before input is complete in the frequency and duration model. Thus, Neighbor_Capacity only represents the net fossil resources of the neighbor. Therefore Neighbor_EnergyLimitedResources will not be taken into consideration in the logic of the model.

CumulativeMWOfflineDistribution is calculated based on the average EFOR and average unit size for each neighbor. The logic is run at the beginning of the simulation and stored as an array for use during the simulation. Pseudocode for the processing logic is generally as follows:

For p=0 to Number of Units in Neighbor
   Temp=(1−t)^(n−p)*(t)^p*(n!/(n−p)!p!)
   Totalprob=totalprob+temp
   MWProb(p)=p*unitsize
   PercentProb(p)=totalprob
Next In the preceding pseudocode, t represents the average EFOR; p is a counter; n is the Number of Units in the Neighbor; MWProb is an array that stores the associated MW offline at a given probability; PercentProb represents the cumulative probability distribution of number of units being in a forced offline state; and unit size is calculated as Neighbor_Capacity/Number of Units in Neighbor. Neighbor capacity, neighbor peak load, average EFOR, Number of Units in the Neighbor, and CBM are all inputs to the frequency and duration model.

The final component to the market purchase processing logic is actually an interface with the transmission module. There are two components to the transmission module: internal constraints and interface constraints.

The logic for modeling constraints on internal interfaces requires the capability of entering load on an area basis and not just for the entire control area.

Collecting available transfer capacity (ATC) and market purchase data for all of the interfaces to the electric utility allows for the creation of distributions for the availability of transmission capacity at each of those interfaces.

In summary, market purchases are dispatched twice in the simulation model. The first dispatch is in an economic manner; the second dispatch is in an emergency manner. During the economic dispatch, the available transmission capacity will not receive any special treatment. During the emergency dispatch, the available transmission capacity will reflect calling CBM. Emergency dispatch of market purchases will only occur if all other resources have been expended.

To determine the expected amount of economic transmission capacity available, a distribution of megawatts available for each interface will be stored monthly. When the model selects values across the interfaces, there will be correlation between the available transmission capacities at different ties to represent the general reality that when transmission capacity is low at one tie, it will likely be low at other ties.

To calculate the net megawatts purchased, the minimum of short amount, generation capacities available and transmission capacity available will be used to represent the amount of energy purchased.

Unit Outage Processing Logic

The most pressing issue in modeling unit outages is the impact of unit outages on reliability convergence. Because a unit outage can overlap multiple iterations of the simulation, each iteration is not independent. If each iteration is not independent, convergence may not occur until a higher number of iterations is completed. Simply re-initializing the position of each unit in the time to repair and time to failure distributions could lead to inordinately high forced outage rates because points are randomly selected out of these distributions. Because a point with a low number of hours could be selected as easily as a point with a high number of hours, the low number points could be chosen more often than they should be chosen statistically.

In order to model unit outage more reliably, the following algorithm is implemented:

1. Calculate the forced outage rate (FOR) by taking the average of TTR values for January/(Average of TTR values for January+Average of TTF Values*TTFmlt for January);
2. Select a random value between 0 and 1;
3. If random value <FOR, then unit will be on outage; else unit will be online;
4. Select new random value and multiply times sum of all TTF values or TTR values.
5. Loop through array of TTF_hrs or TTR_hrs incrementing iteration variable i until result of step 4>outage_total; outage_total increases as the array is stepped through by outage_total=outage_total+TTF_hrs(i) OR TTF_hrs(i).
6. The starting point of the unit for TTF_hrs or TTR_hrs will be TTF_hrs(i−1) or TTR_hrs(i−1)

In this algorithm, TTFmlt represents seasonal or monthly multipliers to be applied to an annual time to fail average value for a unit. TTF_hrs array contains all the observed service hours between failures for each unit. TTR_hrs array contains all the observed repair hours during failures.

Typically only the seasonal maintenance events are considered in the frequency and duration model. If a unit has an operational issue, but is able to stay online until the end of the next weekend, the unit is never sent to a forced outage (FO) state, but rather to a maintenance state. The following pseudocode represents the associated processing logic:

If hrsins(unit)<1 then
   If rand<probmaintenance(unitnum)+trigger(unitnum) =0
   Hrsins(unit)=Friday afternoon hour−currenthr
   Else
     Trigger(unitnum)=0
     Send unit to FO state
   End if Hrsins represents the current hour position of Hours to Failure for the current unit. Trigger is a variable that represents whether a unit can be sent to a maintenance outage or must be sent to forced outage.

Probmaintenance(unitnum) is a variable input for each unit which represents the number of maintenance events/number of total outage events. All of the hours offline for maintenance events will be added to the TTF_hrs array.

Weather Capacity Relationships

An important use of the frequency and duration simulation model is the development of incremental capacity equivalent (ICE) factors for interruptible customers. Generally, ICE factors represent the worth of load management resources, such as interruptible service contracts, relative to the value of incremental generating capacity that can be added to the system. To do this accurately, it is important to correctly model the load-resource balance at all hours of a day. The frequency and duration simulation model has the ability to limit the capacity on an hourly basis based on the temperature. In summary, the frequency and duration simulation model determines weather capacity relationships as follows:

1. Each load file includes a column for temperature;
2. All combined cycles and combustion turbines will have a unique set of values specifying the capacity multiplier at each degree for all temperatures;
3. Adjust committed capacity each hour for combined cycles and combustion turbines based on the above set of specified capacity values;
4. Adjust committed capacity when transferring units to or from committed capacity;
5. Use the adjusted capacity values of the units for calculating the resources to be committed for that day (day-needed units module).

EUE Sharing and Accounting

The cost of EUE is dependent on a number of factors including the number of EUE events in a given year, the duration of the outage event, the customer class split, the duration of the event before rolling to different customers, the day of the week, and the time of day. Not all factors can be modeled efficiently.

The general philosophy in a firm load shed event is to shed non-essential load first. If there are a very small number of events per year, this philosophy is practical. However, if the electric utility system is forced to shed load more often, the load must be shed on a more equitable basis.

For each iteration of the frequency and duration model, the LOLH counter will determine which array from which to get the EUE cost. If LOLH<4, then EUE is taken from primarily residential, so the net EUE cost would be relatively low. If LOLH>=4, the EUE is spread across the customer classes based on the peak load ratio, so the impact of commercial and industrial load shed would cause the EUE cost to be much higher.

Figure 7:
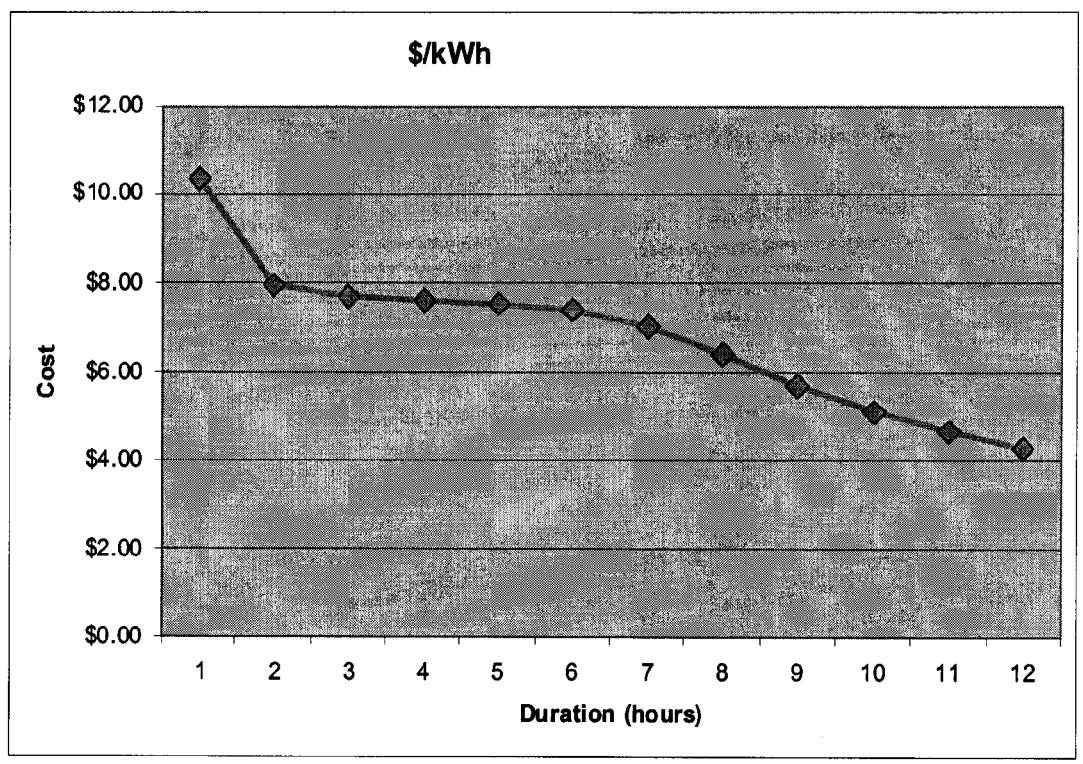
FIG. 7 illustrates the incremental impact on cost of an outage as a function of the duration of the outage in an exemplary embodiment.

If the electric utility is forced to shed firm load, the implied cost to the individual customers starts off very high on a cost per kilowatt hour ($/kwh) basis. As the length of the outage increases, the incremental impact of the outage becomes lower. This effect is shown in FIG. 7.

The EUE cost calculation is performed at the end of each iteration. Each event based on the consecutive hours of EUE will be matched with the appropriate cost per kilowatt hour from the cost array. The impact of which customers will be cut is taken into account during the determination of the cost of EUE.

Outages are rolled so that one customer doesn't experience an inequitable share of the unserved energy. As customers roll off the firm load shed, they will experience a significant increase in load as their appliances are in start-up. This will require shedding even more firm load for the subsequent hour. Also, there is a significant impact to the cost of EUE on a cost per kilowatt hour basis depending on whether an individual customer's load is shed for one hour or four hours. This impact can be seen in FIG. 7.

Input variables are provided for the user to specify the length of each customer's outage in hours as well as for the payback energy penalty. In the simulation model, a counter is implemented for consecutive hours of EUE. Each hour that the counter becomes greater than the input variable, the EUE will increase based on the payback energy penalty, and the counter will be reset.

If a load shed were to occur on a weekend or at night, there would be a lower cost of EUE. However, because such a very small percentage of EUE will fall on nights and weekends, the increasing complexity to include this logic is not offset by the improvement in accuracy of the model.

In summary, the frequency and duration simulation model determines EUE as follows:

1. The EUE for each hour will be assigned to unique customer blocks;
    a. In the following hour, if the outage duration has been reached, that customer's EUE block will be set to 0;
    b. If the outage duration has not been reached, and the EUE decreases, the EUE for the customer block will decrease to the amount of EUE;
    c. If EUE increases in the following hour, the first customer block of EUE will stay constant, and a second customer block will be assigned the additional EUE;
    d. When a customer's EUE is reduced, additional load is incurred based on an energy payback input by the analyst. The net impact of bringing a customer group back online is shown in the formula below:
       adjusted_eue(current_hr)=adjusted_eue(prev_hr)−(adjusted_eue(prev_hr)−preadjustment eue(current hr))/(1+payback)
       In this formula, adjusted_eue is the final value reported for eue; preadjustment_eue is the result of load—total resources prior to the impact of payback penalty energy; and payback is the percentage energy payback input by the analyst. This formula is applicable only when the EUE for the current hour is less than the EUE for the previous hour.
2. At the end of the day, the duration of all the events is calculated and assigned an EUE cost. The EUE cost is determined by the duration and how many EUE events have been incurred in the case year.

Processing Logic for Committing Units

Figure 8:
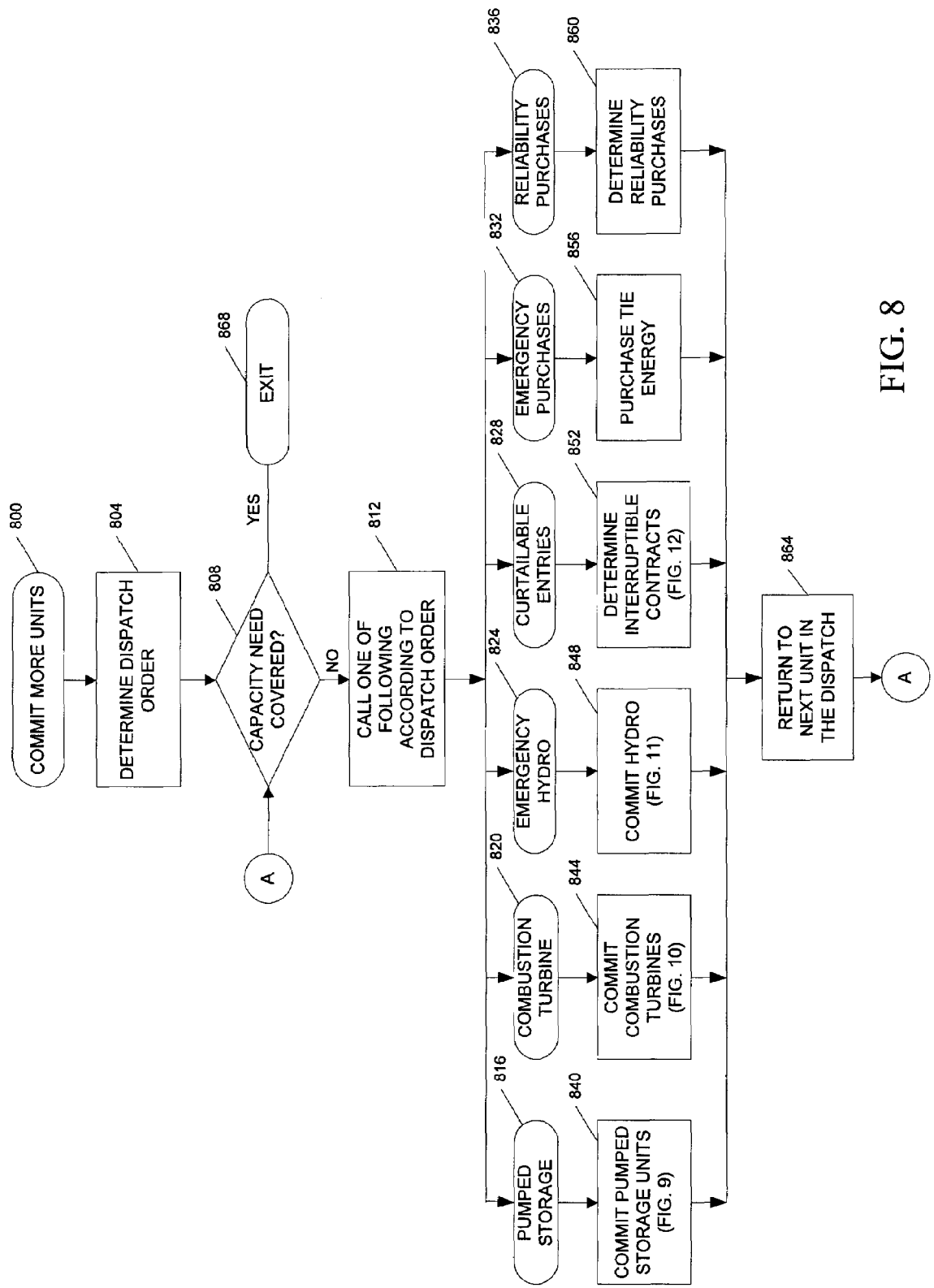
FIG. 8 illustrates simulation processing logic for committing additional units based on the dispatch order in an exemplary embodiment.

Exemplary simulation processing logic for committing additional units (block 800) based on the dispatch order is illustrated in FIG. 8. This module determines a dispatch order (block 804) and loops through the dispatch until the load is covered. The dispatch order is determined by means of the threshold ratios among the normal dispatch order, the risk aversion dispatch order and the reliability dispatch order. A test is performed in decision block 808 to determine if the capacity need has been covered for the current hour being simulated. If it has been covered, processing returns to the calling simulation module. If capacity has not been covered, then one of several logic modules will be called according to the dispatch order that has been determined, as indicated in block 812. There is a separate processing logic module for each type of unit that can be dispatched. As can be seen from examination of FIG. 8, the dispatch can include pumped storage 816, combustion turbines 820, emergency hydro 824, curtailable entries (i.e., interruptible contracts) 828, emergency purchases 832 and reliability purchases 836. For dispatching pumped storage hydro 816, the commit pumped storage units module (FIG. 9) is called as indicated in block 840. Combustion turbines are dispatched using the logic of FIG. 10, as indicated in block 844. Similarly, emergency hydro is dispatched using the logic of FIG. 11, as indicated in block 824. For curtailable contracts with residential and industrial customers, interruptible contracts are determined using the logic of FIG. 12, as indicated in block 852. In the event that the dispatch order requires emergency purchases from neighboring energy providers (e.g., Tennessee Valley Authority), a purchase tie energy module is called as indicated in block 856. In the event that the dispatch order requires reliability purchases, a determine reliability purchases module is called as indicated in block 860. Processing logic then loops back to the next unit in the dispatch as indicated in block 864. The commit more units module continues execution until the capacity need has been covered (decision block 808).

Figure 9:
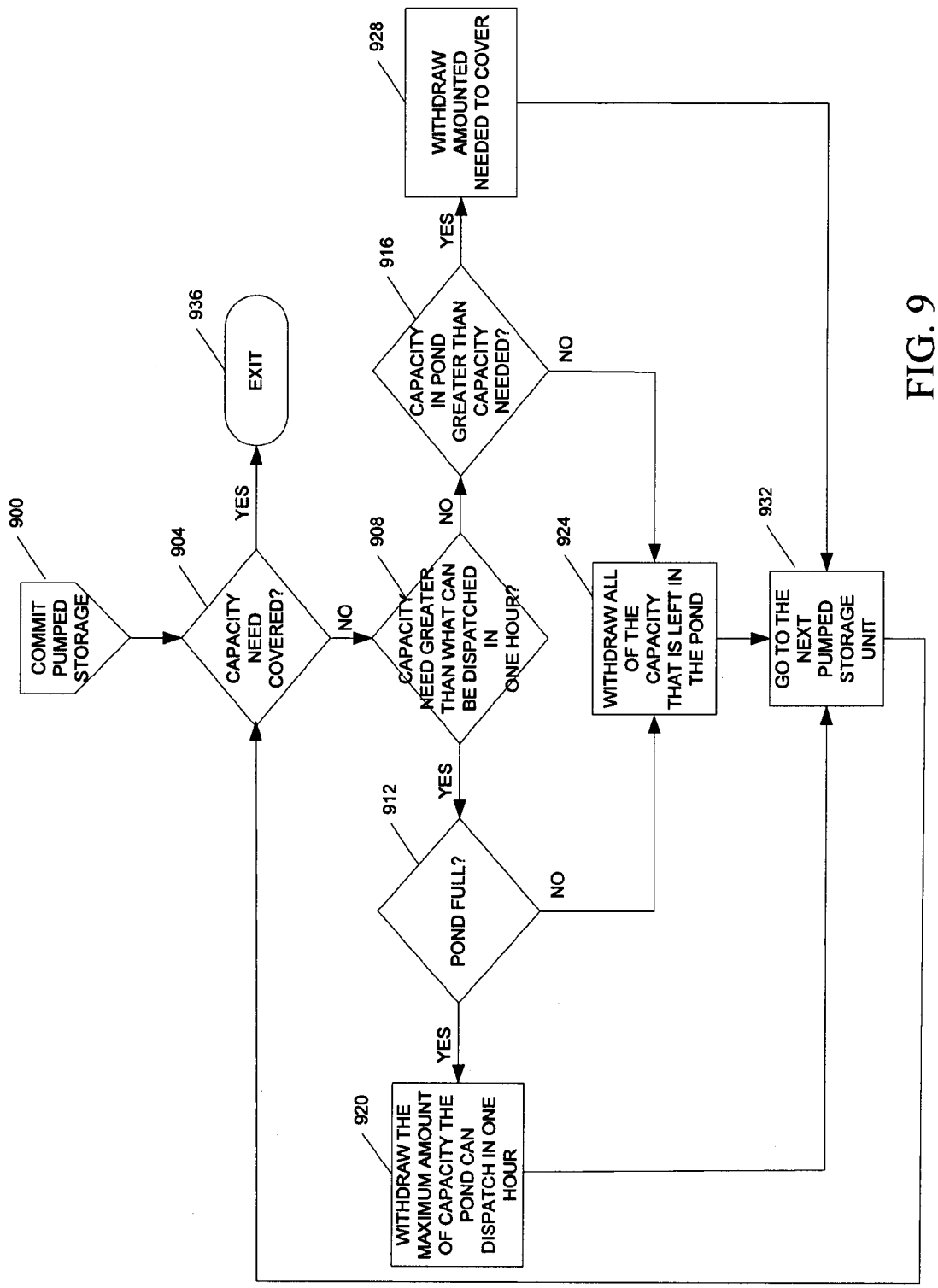
FIG. 9 illustrates simulation processing logic for committing pumped storage hydro units in an exemplary embodiment.

FIG. 9 illustrates exemplary simulation processing logic for committing pumped storage hydro units (block 900). A test is performed in decision block 904 to determine if the capacity need has been covered for the current hour being simulated. If it has been covered, processing returns to the calling simulation module in block 936. If capacity has not been covered, a determination is made in decision block 908, as to whether or not the amount of capacity needed in the next hour is greater than can be dispatched by the pumped storage unit. If the amount of capacity needed is greater than can be dispatched by the pumped storage unit, another test is made in decision block 912 to determine if the unit's pond is full. If the pond is full, then the maximum amount of capacity that can be dispatched in one hour is withdrawn as indicated in block 920. If the pond is not full, all of the capacity that is left in the pond is withdrawn as indicated in logic block 924. From both logic blocks 920 and 924, processing continues in block 932 by going to the next pumped storage unit for analysis. From block 932, processing logic returns to decision block 908 to determine if capacity needed in the next hour has been met.

If the amount of capacity needed is less than the amount that can be dispatched by the pumped storage unit as determined in decision block 908, another test is made in decision block 916 to determine if the amount of capacity in the pond is greater than the amount of capacity needed? If it is, then the amount needed to cover the required capacity as indicated in bock 928. If the pond capacity is not greater than the needed capacity, then all of the capacity left in the pond is withdrawn as indicated in logic block 924. From both logic blocks 924 and 928, processing continues in block 932 and then loops back to decision block 908 as discussed in the preceding paragraph.

Figure 10:
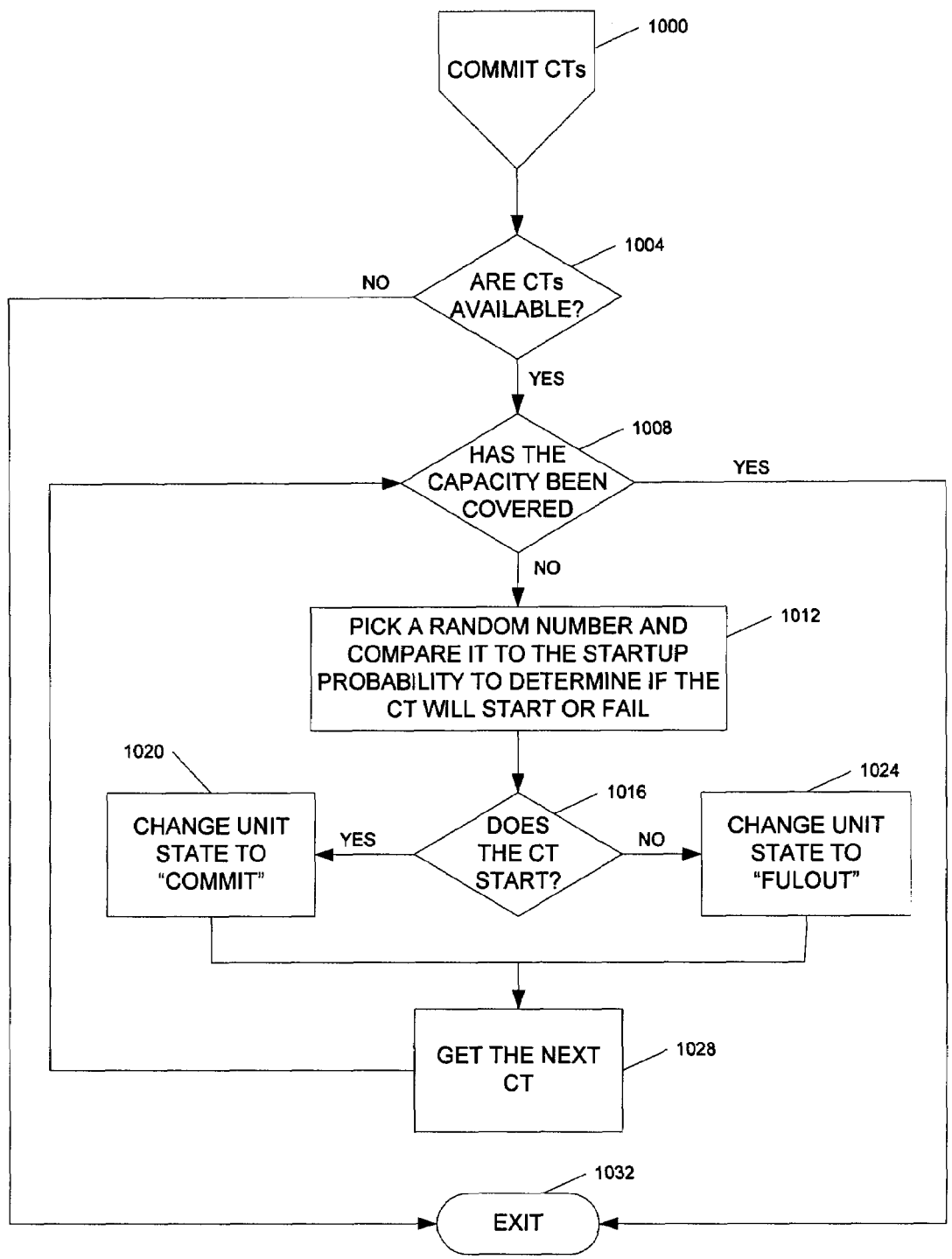
FIG. 10 illustrates simulation processing logic for committing combustion turbine units in an exemplary embodiment.

FIG. 10 illustrates exemplary simulation processing logic for committing combustion turbine units (block 1000). In decision block 1004, a test is made to determine if there are combustion turbines available. If there are combustion turbines available, then a further test is made in decision block 108 to determine if capacity needed has already been dispatched. If it has, processing returns to the calling simulation module as indicated in block 1032. If needed capacity has not been dispatched previously, then the simulation logic generates a random value and compares that value to the startup probability to determine if the combustion turbine will start or fail as indicated in block 1012. The comparison between the random value and startup probability is made in decision block 1016. If the determination is that the combustion turbine will start, then the state of the combustion turbine is changed to "commit" as indicated in block 1020. If the determination is that the combustion turbine will fail, then the state of the combustion turbine is changed to "full out" as indicated in block 1020. From both blocks 1020 and 1024, processing continues with block 1028 which gets the next combustion turbine and then loops back to decision block 1008 to determine if needed capacity has been met.

Figure 11:
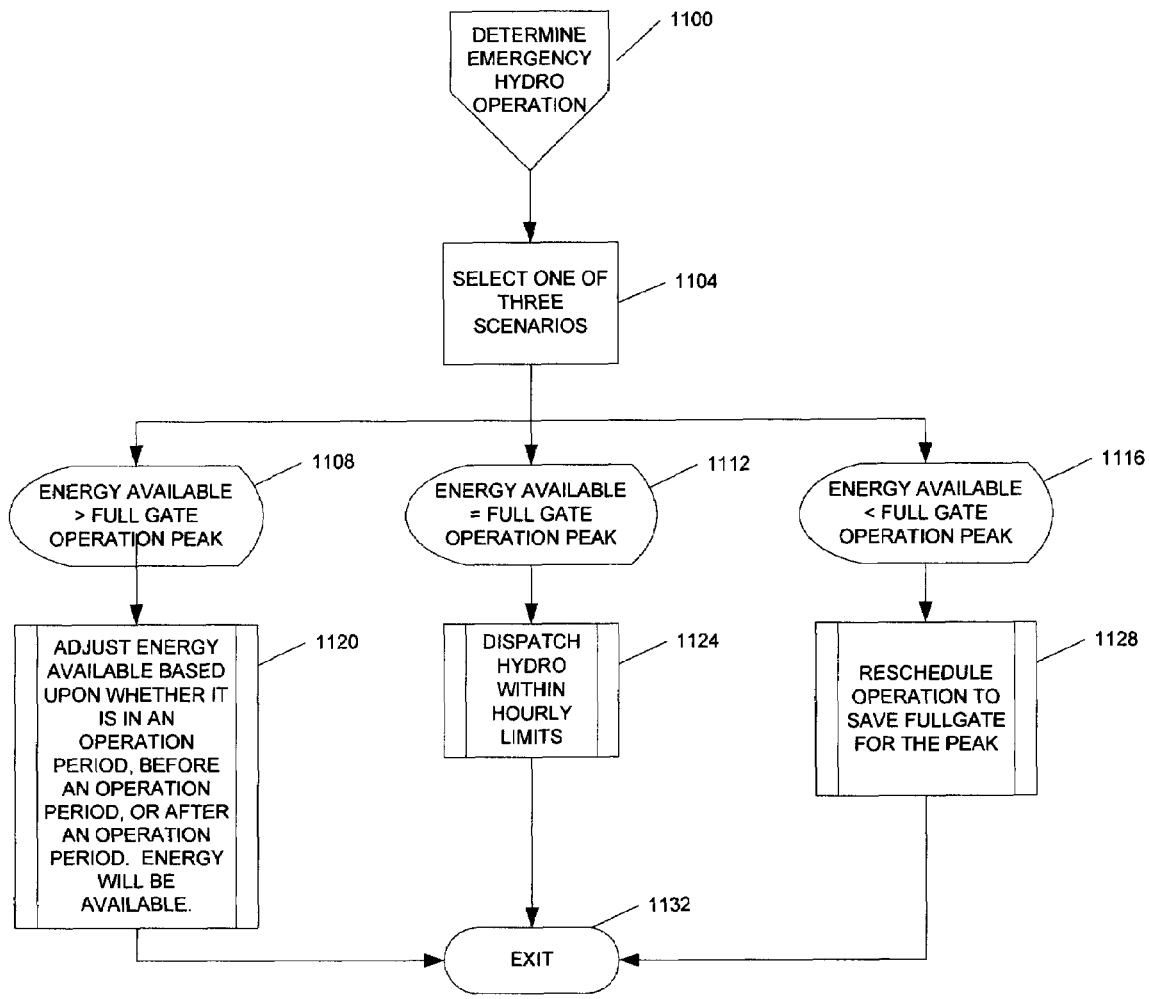
FIG. 11 illustrates simulation processing logic for determining emergency hydro operation in an exemplary embodiment.

FIG. 11 illustrates exemplary simulation processing logic for determining emergency hydro operation (block 1100). This module determines the amount of hydro that can be run based upon certain conditions. One of three scenarios is first selected as indicated in logic block 1104. The three scenarios are represented in blocks 1108, 1112 and 1116, respectively. The first scenario (block 1108) condition is energy available is greater than full gate operation peak. The second scenario (block 1112) is energy available equals full gate operation peak. The third scenario (block 1116) condition is energy available is less than full gate operation peak. If the first scenario has been selected, then the available energy is adjusted based upon whether the current hour is in an operation period, or before or after an operation period, as indicated in logic block 1120. If the second scenario has been selected, then hydro is dispatched within hourly limits as indicated in logic block 1124. If the third scenario has been selected, then the hydro dispatch operation is rescheduled to save full gate operation for the peak as indicated in logic block 1128. From blocks 1120, 1124 and 1128, processing returns to the calling simulation module as indicated in block 1132.

Figure 12:
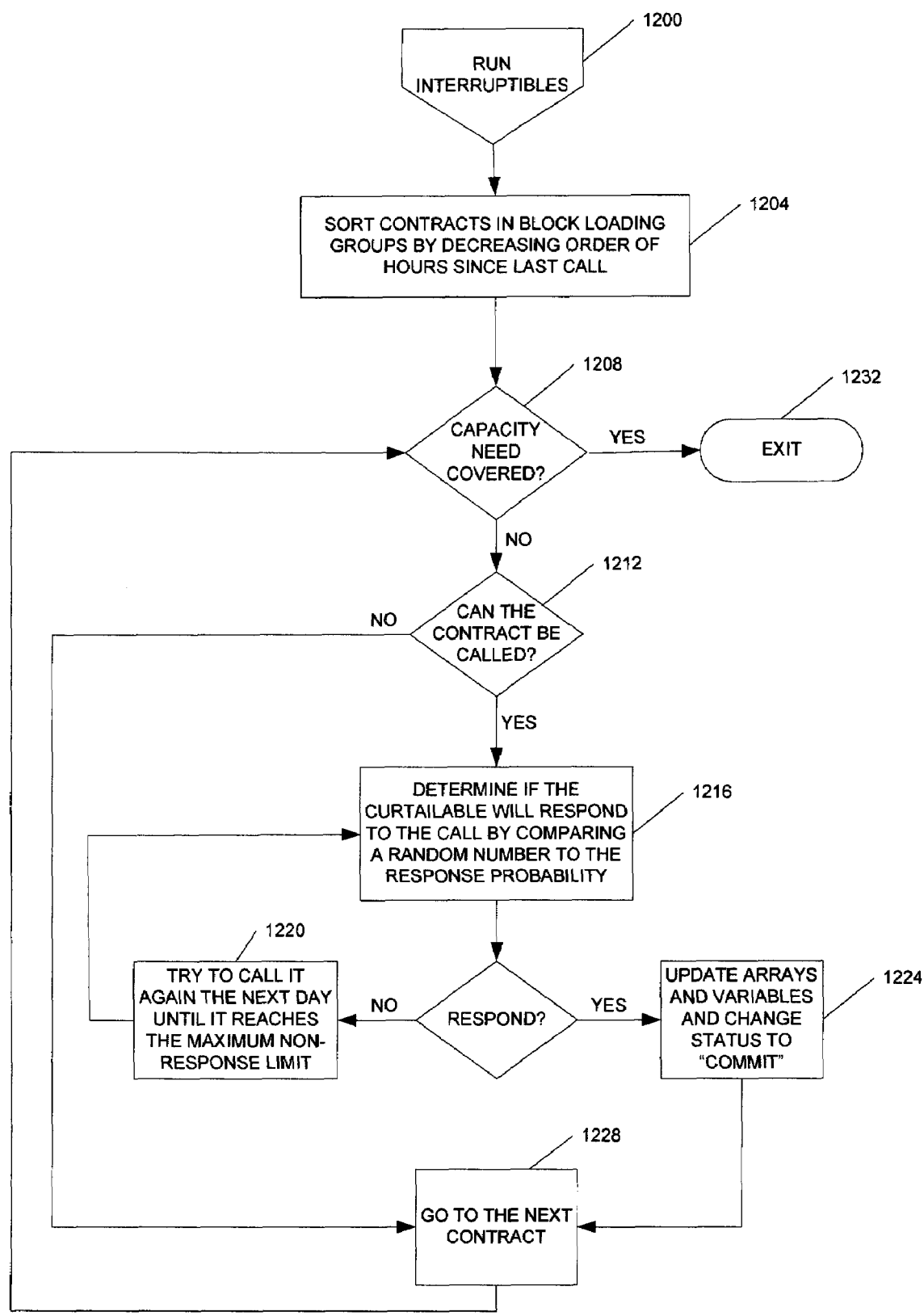
FIG. 12 illustrates simulation processing logic for dispatching interruptible services in an exemplary embodiment.

FIG. 12 illustrates exemplary simulation processing logic for dispatching interruptible services (block 1200). In this embodiment, interruptible contracts are sorted in block loading groups by decreasing order of hours since last call. This sort process is indicated in logic block 1204. In decision block 1208, a determination is made as to whether or not the capacity need has been covered. If it has, processing returns to the calling simulation module in block 1232. If capacity need has not been covered, a determination is made in decision block 1212 as to whether or not the contract can be called. If the contract cannot be called, processing continues by going to the next contract as indicated in block 1228. If the contract can be called in decision block 1212, a test is made in decision block 1216 to determine if the curtailable customer will respond to the call by comparing a random value to the response probability. If the comparison results in no response, an attempt is made the next day until the calls reach the maximum non-response limit, as indicated in block 1220. If the curtailable customer responds in decision block 1216, then the status is changed to commit as indicated in block 1224. Processing then continues by going to the next contract in block 1228.

Processing Logic for Unit Outages

Figure 13:
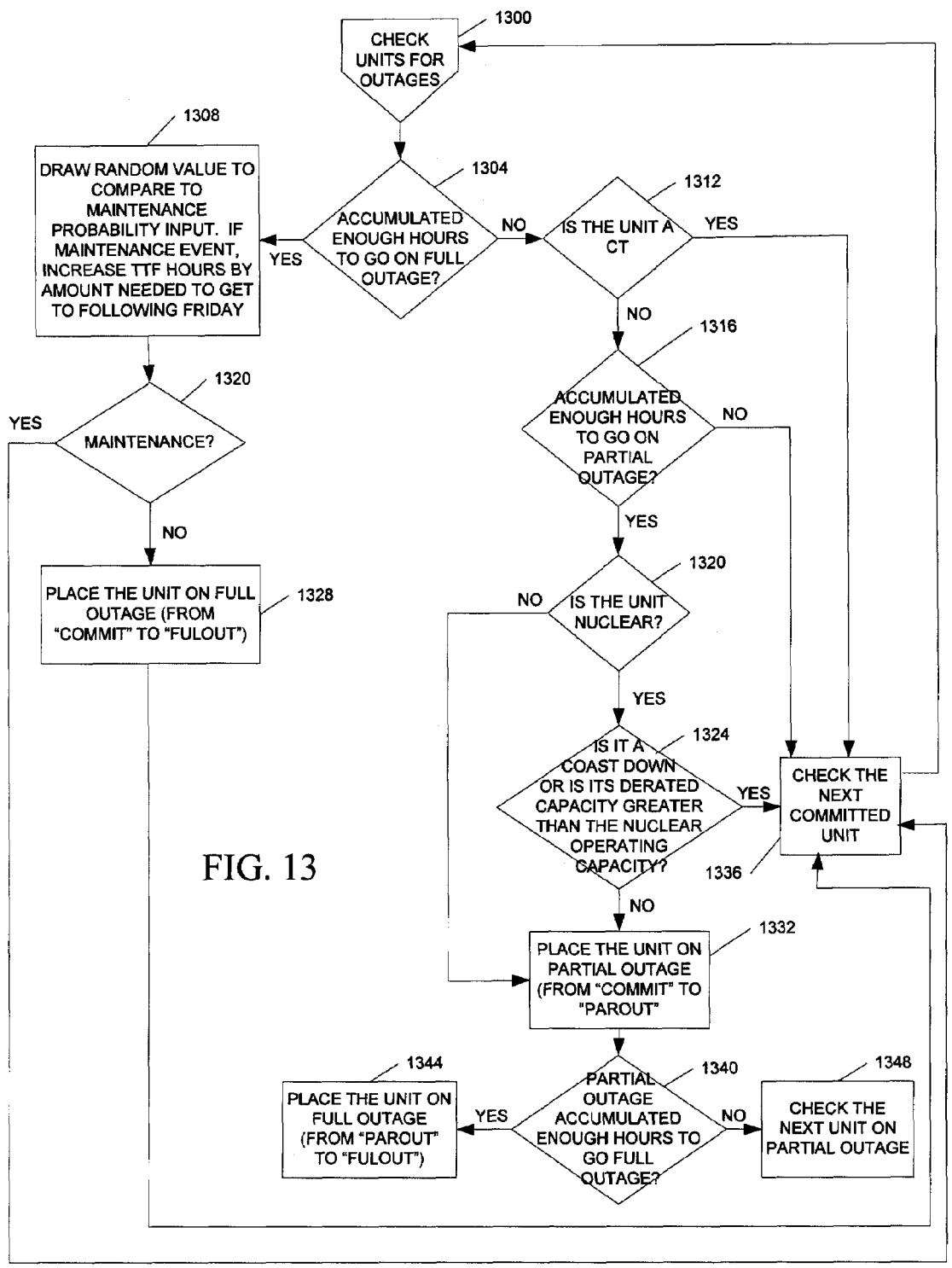
FIG. 13 illustrates simulation processing logic for determining if the time for a unit outage has occurred in an exemplary embodiment.

FIG. 13 illustrates exemplary simulation processing logic for determining if the time for a unit outage has occurred (block 1300). This module loops through committed units to determine if the time has come for an outage to occur. In decision block 1304, a test is made to determine if the unit being checked has accumulated enough hours to go on full outage. If it has, then a random value is drawn to compare to the maintenance probability input. If a maintenance event occurs, then the time to failure hours are increased by an amount needed to get to the following Friday as indicated in logic block 1308. The test to determine for maintenance is indicated in decision block 1320. If the test is negative for maintenance, then the unit is placed on full outage in block 1328 and processing logic proceeds to check the next committed unit in block 1336. Each time block 1336 is reached, processing logic returns to decision block 1304 to determine if the unit being checked has accumulated enough hours to go on full outage. If the test is positive for maintenance in decision block 1320, then processing logic proceeds to check the next unit in block 1336. If the test made in decision block 1304 determined that the unit being checked has not accumulated enough hours to go on full outage, then in decision block 1312 a test is made to determine if the unit being checked is a combustion turbine. If the unit being checked is a combustion turbine, processing logic continues in block 1336 to check the next committed unit. If the unit being checked is not a combustion turbine, a test is made in decision block 1316 to determine if the unit has accumulated hours to go on partial outage. If the unit has not accumulated enough hours to go on partial outage, then processing continues in block 1336 to check the next committed unit.

In decision block 1316, if the unit has accumulated enough hours to go on partial outage, a test is made to determine if the unit being checked is nuclear. If the unit is not nuclear, it is placed on partial outage as indicated in block 1332. If the unit being checked is determined to be nuclear in decision block 1320, a test is performed in decision block 1324 to determine if the nuclear is in coast down, or has a derated capacity greater than the nuclear operating capacity. If either of theses conditions is found, then processing logic returns to block 1336 to check the next unit. If neither condition is found, then the nuclear unit is placed on partial outage as indicated in block 1332.

After checking all committed units to determine if the time for an outage has elapsed, the committed units on partial outage are checked for accumulated hours. For each committed unit on partial outage, a test is performed in decision block 1340 to determine if the unit has accumulated enough hours to go to full outage. If the unit being checked has accumulated enough hours, then it is status is changed to full outage as indicated in block 1344. Otherwise, the next unit on partial outage is checked as indicated in block 1348. This loop continues until all units on partial outage have been checked.

Processing Logic for Optimizing Reserve Margin

Figure 14:
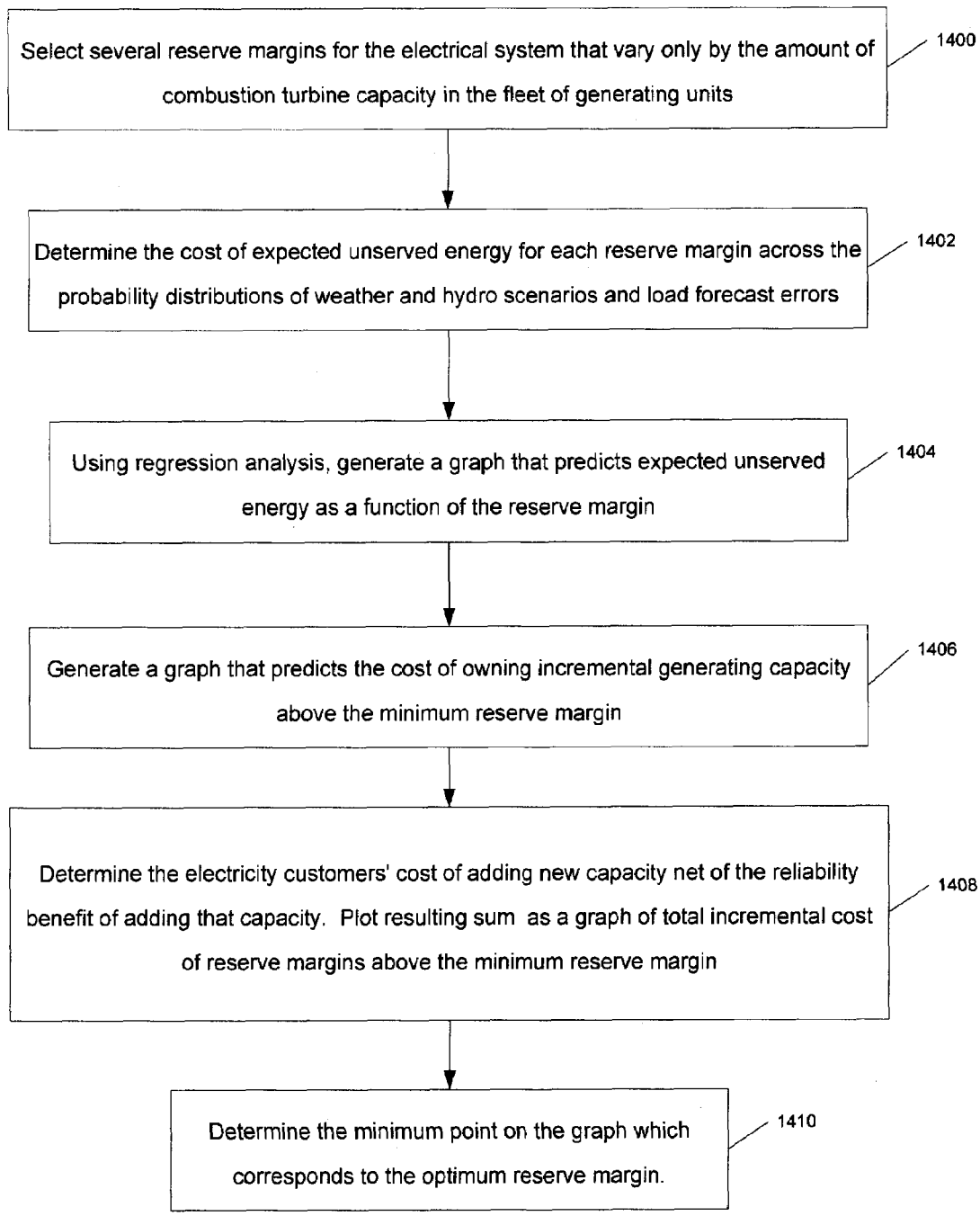
FIG. 14 illustrates processing logic for optimizing the reserve margin for an electrical generation system.

The previous sections have described in detail how the cost of expected unserved energy and costs of market purchases are determined for a specific scenario to quantify generation reliability risks. One application of the frequency and duration model is to determine the optimum reserve margin for an electrical utility system. As illustrated in FIG. 14, the following processing steps are performed:

1. Select several reserve margins for the electrical system that vary only by the amount of combustion turbine capacity in the fleet of generating units (step 1400). For example, system configurations with 10%, 13%, 15% and 17% would be sufficient for many electrical systems.
2. Determine the cost of expected unserved energy for each of these selected reserve margins using the frequency and duration simulation model across the probability distributions of weather and hydro scenarios and load forecast errors (step 1402).
3. Using regression analysis and the results of step 1402, generate a graph that predicts expected unserved energy as a function of the reserve margin (step 1404).
4. Using economic carrying costs techniques and the annual cost of owning combustion turbines, generate a graph that predicts the cost of owning incremental generating capacity above the minimum reserve margin (e.g., 10%) (step 1406).
5. Add the results of the graph from step 1404 to the results of the graph from step 1406 to determine the electricity customers' cost of adding new capacity net of the reliability benefit of adding that capacity. The resulting sum can then be plotted as a graph of total incremental cost of reserve margins above the minimum reserve margin, with annual cost on the y-axis, and reserve margin on the x-axis (step 1408).

6. Determine the minimum point on the graph which corresponds to the optimum reserve margin (step 1410).

Figure 15:
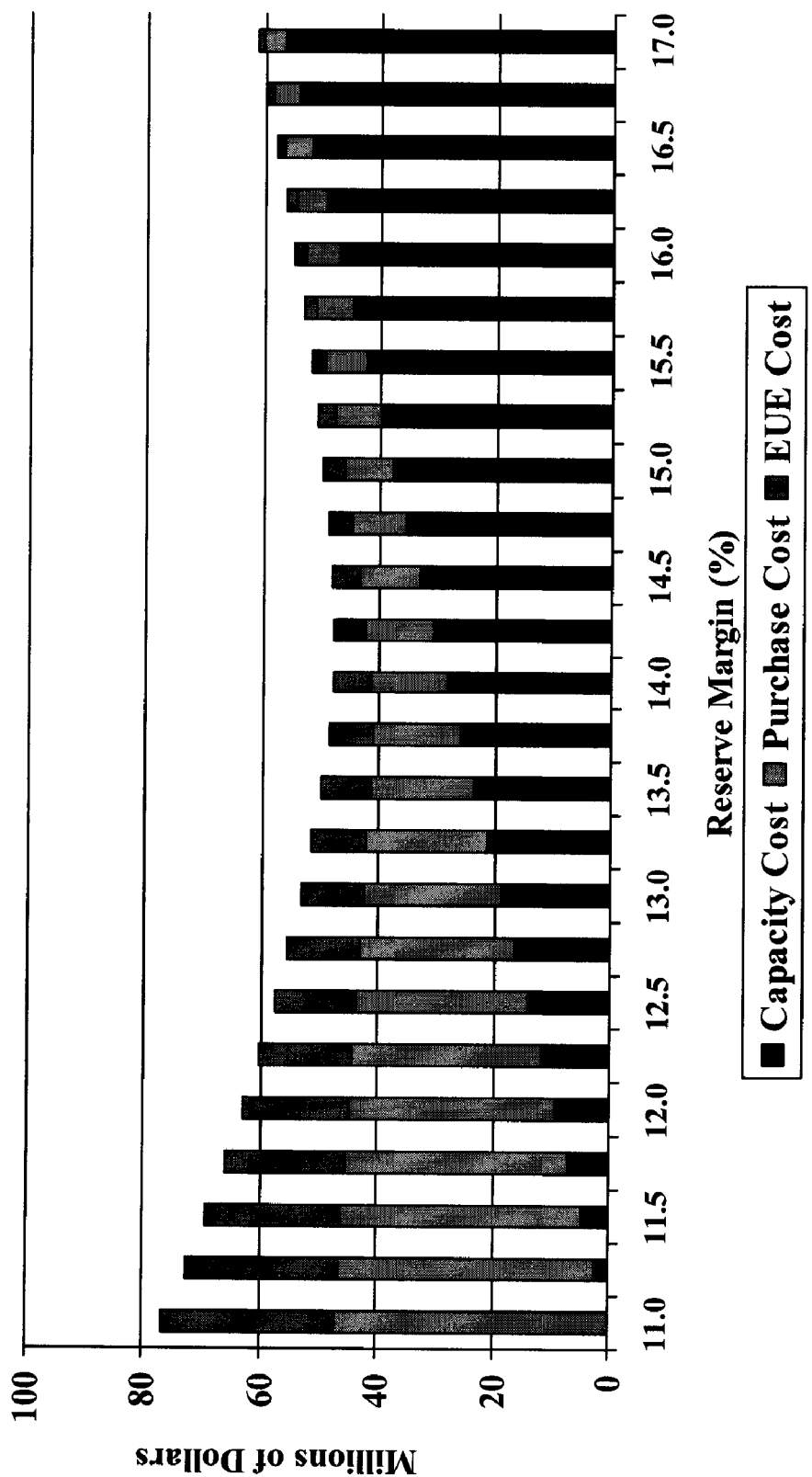
FIG. 15 illustrates an exemplary graph of capacity cost, purchase cost, and EUE cost as a function of reserve margin.

FIG. 15 illustrates an exemplary graph of the sum of capacity cost, purchase cost, and EUE cost as a function of reserve margin.

The system and method of the present invention have been described as computer-implemented processes. It is important to note, however, that those skilled in the art will appreciate that the mechanisms of the present invention are capable of being distributed as a program product in a variety of forms, and that the present invention applies regardless of the particular type of signal bearing media utilized to carry out the distribution. Examples of signal bearing media include, without limitation, recordable-type media such as diskettes or CD ROMs, and transmission type media such as analog or digital communications links.

The corresponding structures, materials, acts, and equivalents of all means plus function elements in any claims below are intended to include any structure, material, or acts for performing the function in combination with other claim elements as specifically claimed. Those skilled in the art will appreciate that many modifications to the exemplary embodiment are possible without departing from the spirit and scope of the present invention.

In addition, it is possible to use some of the features of the present invention without the corresponding use of the other features. Accordingly, the foregoing description of the exemplary embodiment is provided for the purpose of illustrating the principles of the present invention, and not in limitation thereof, since the scope of the present invention is defined solely by the appended claims.

What is claimed:

1. A method for quantifying an expected unserved energy in an energy generation system, wherein all steps are performed by a computer, comprising:
    generating an energy load demand forecast based at least in part on a weather year model stored in a memory of the computing system;
    committing a plurality of energy generation resources to meet the energy load demand;
    determining an operating status for each committed energy generation resource in the energy generation system;
    determining if the committed resources are sufficient to meet the energy load demand;
    selecting a dispatch order for a plurality of additional energy resources if the committed resources are not sufficient to meet the energy load demand, wherein the plurality of energy resources includes a plurality of steam units, a plurality of pumped storage hydro units, a plurality of combustion turbine units, a plurality of combined cycle units, a plurality of emergency hydro resources, a market purchase of energy and a plurality of curtailable contracts;
    dispatching the plurality of curtailable contracts in a descending order based on an elapsed time since a previous curtailment for each contract such that the contract having a longest elapsed time is curtailed first providing an even distribution of energy load shedding among a plurality of customers having curtailable contracts;
    committing additional resources based on the selected dispatch order until the energy load demand is met; and
    determining the expected unserved energy and shedding an equivalent amount of energy load demand based at least in part on an expected duration of unserved energy and a customer class grouping.

2. The method for quantifying an expected unserved energy of claim 1 further comprising determining an associated cost for the expected unserved energy.

3. The method for quantifying an expected unserved energy of claim 1 wherein determining an operating status for each committed energy generation resource comprises checking an accumulated number of operating hours for each energy generation resource to determine if the resource should be placed in a full outage or a partial outage condition.

4. The method for quantifying an expected unserved energy of claim 3 wherein determining if the resource should be placed in a full outage condition is based on a comparison between the accumulated number of operating hours and a randomly selected time to failure based on an actual time to failure data distribution for the resource.

5. The method for quantifying an expected unserved energy of claim 4 further comprising determining if the resource in a full outage condition should be returned to an operational and committed status based on a randomly selected time to repair from an actual time to repair data distribution for the resource.

6. The method for quantifying an expected unserved energy of claim 3 wherein determining if the resource should be placed in a partial outage condition is based on accumulated operating hours, a mean time to failure and a mean time to repair for the resource.

7. The method for quantifying an expected unserved energy of claim 6 wherein determining if the resource in a partial outage condition should be placed in a full outage condition is based on accumulated operating hours.

8. The method for quantifying an expected unserved energy of claim 1 wherein selecting a dispatch order comprises determining a ratio of peak demand to available energy resource capacity and comparing the ratio against a threshold value.

9. The method for quantifying an expected unserved energy of claim 8 wherein a predetermined normal dispatch order is selected if the ratio is less than the threshold value.

10. The method for quantifying an expected unserved energy of claim 8 wherein a predetermined risk aversion dispatch order is selected if the ratio is greater than a first threshold value but less than a second threshold value.

11. The method for quantifying an expected unserved energy of claim 8 wherein a predetermined reliability dispatch order is selected if the ratio is greater than the threshold value.

12. The method for quantifying an expected unserved energy of claim 1 wherein the market purchase of energy is based on a market price of energy, an available generating capacity and an available transmission capacity of a neighbor energy generation system.

13. The method for quantifying an expected unserved energy of claim 12 wherein the amount of energy purchased is a minimum of an amount of energy still needed to meet the energy load demand, the available generating capacity and the available transmission capacity.

14. The method for quantifying an expected unserved energy of claim 12 wherein the market price of energy is estimated based on an expected energy reserve margin for a year and a magnitude of an hourly difference between energy load demand and available energy resources.

15. The method for quantifying an expected unserved energy of claim 1 wherein shedding an equivalent amount of energy load demand comprises:
  determining a loss of load hours associated with the expected unserved energy;
  shedding the energy load demand for at least one residential customer if the loss of load hours is less than a specified value.

16. The method for quantifying an expected unserved energy of claim 1 wherein shedding an equivalent amount of energy load demand comprises:
  determining a loss of load hours associated with the expected unserved energy;
  shedding the energy load demand for at least one commercial and industrial customer if the loss of load hours is equal to or greater than a specified value.

17. A computer readable storage medium having a plurality of computer readable instructions encoded therein, which when executed by a computer causes the computer to implement a method for quantifying an expected unserved energy in an energy generation system, comprising:
  generating an energy load demand forecast based at least in part on a weather year model stored in a memory of the computing system;
  committing a plurality of energy generation resources to meet the energy load demand;
  determining an operating status for each committed energy generation resource in the energy generation system;
  determining if the committed resources are sufficient to meet the energy load demand;
  selecting a dispatch order for a plurality of additional energy resources if the committed resources are not sufficient to meet the energy load demand, wherein the plurality of energy resources includes a plurality of steam units, a plurality of pumped storage hydro units, a plurality of combustion turbine units, a plurality of combined cycle units, a plurality of emergency hydro resources, a market purchase of energy and a plurality of curtailable contracts;
  dispatching the plurality of curtailable contracts in a descending order based on an elapsed time since a previous curtailment for each contract such that the contract having a longest elapsed time is curtailed first providing an even distribution of energy load shedding among a plurality of customers having curtailable contracts;
  committing additional resources based on the selected dispatch order until the energy load demand is met; and
  determining the expected unserved energy and shedding an equivalent amount of energy load demand based at least in part on an expected duration of unserved energy and a customer class grouping.

18. The computer readable storage medium for quantifying an expected unserved energy of claim 17 wherein the method implemented by the computer further comprises determining an associated cost for the expected unserved energy.

19. The computer readable storage medium for quantifying an expected unserved energy of claim 17 wherein the method implemented by the computer further comprises checking an accumulated number of operating hours for each energy generation resource and determining if the resource should be placed in a full outage or a partial outage condition.

20. The computer readable storage medium for quantifying an expected unserved energy of claim 19 wherein the method implemented by the computer further comprises comparing the accumulated number of operating hours and a randomly selected time to failure based on an actual time to failure data distribution for the resource.

21. The computer readable storage medium for quantifying an expected unserved energy of claim 20 wherein the method implemented by the computer further comprises determining if the resource in a full outage condition should be returned to an operational and committed status based on a randomly selected time to repair.

22. The computer readable storage medium for quantifying an expected unserved energy of claim 19 wherein the method implemented by the computer further comprises evaluating accumulated operating hours, a mean time to failure and a mean time to repair for the resource.

23. The computer readable storage medium for quantifying an expected unserved energy of claim 22 wherein the method implemented by the computer further comprises determining if the resource in a partial outage condition should be placed in a full outage condition based on accumulated operating hours.

24. The computer readable storage medium for quantifying an expected unserved energy of claim 17 wherein the method implemented by the computer further comprises determining a ratio of peak demand to available energy resource capacity and comparing the ratio against a threshold value.

25. The computer readable storage medium for quantifying an expected unserved energy of claim 24 wherein the method implemented by the computer further comprises selecting a predetermined normal dispatch order if the ratio is less than the threshold value.

26. The computer readable storage medium for quantifying an expected unserved energy of claim 24 wherein the method implemented by the computer further comprises selecting a predetermined risk aversion dispatch order if the ratio is greater than a first threshold value but less than a second threshold value.

27. The computer readable storage medium for quantifying an expected unserved energy of claim 24 wherein the method implemented by the computer further comprises selecting a predetermined reliability dispatch order if the ratio is greater than the threshold value.

28. The computer readable storage medium for quantifying an expected unserved energy of claim 17 wherein the method implemented by the computer further comprises determining a market price of energy, determining an available generating capacity and determining an available transmission capacity of a neighbor energy generation system.

29. The computer readable storage medium for quantifying an expected unserved energy of claim 28 wherein the method implemented by the computer further comprises determining an amount of energy purchased based on a minimum of an amount of energy still needed to meet the energy load demand, the available generating capacity and the available transmission capacity.

30. The computer readable storage medium for quantifying an expected unserved energy of claim 28 wherein the method implemented by the computer further comprises selecting the market price of energy based on an expected energy reserve margin for a year and a magnitude of an hourly difference between energy load demand and committed energy resources.

31. The computer readable storage medium for quantifying an expected unserved energy of claim 17 wherein the method implemented by the computer further comprises:
  determining a loss of load hours associated with the expected unserved energy;
  shedding the energy load demand for at least one residential customer if the loss of load hours is less than a specified value.

32. The computer readable storage medium for quantifying an expected unserved energy of claim 17 wherein the method implemented by the computer further comprises:
- determining a loss of load hours associated with the expected unserved energy;
- shedding the energy load demand for at least one commercial and industrial customer if the loss of load hours is equal to or greater than a specified value.

33. A system for quantifying an expected unserved energy in an energy generation system, comprising:
- a memory for storing a plurality of energy load demand data and a plurality of weather data;
- a computer processor in communication with the memory and configured for:
    - generating an energy load demand forecast based on the energy load demand data and weather data stored in the memory;
    - committing a plurality of energy generation resources to meet the energy load demand;
    - determining an operating status for each committed energy generation resource in the energy generation system;
    - determining if the committed resources are sufficient to meet the energy load demand;
    - selecting a dispatch order for a plurality of additional energy resources if the committed resources are not sufficient to meet the energy load demand, wherein the plurality of energy resources includes a plurality of steam units, a plurality of pumped storage hydro units, a plurality of combustion turbine units, a plurality of combined cycle units, a plurality of emergency hydro resources, a market purchase of energy and a plurality of curtailable contracts;
    - dispatching the plurality of curtailable contracts in a descending order based on an elapsed time since a previous curtailment for each contract such that the contract having a longest elapsed time is curtailed first providing an even distribution of energy load shedding among a plurality of customers having curtailable contracts;
    - committing additional resources based on the selected dispatch order until the energy load demand is met; and
    - determining the expected unserved energy and shedding an equivalent amount of energy load demand based at least in part on an expected duration of unserved energy and a customer class grouping.

34. The system for quantifying an expected unserved energy of claim 33 wherein the computer processor is further configured for determining an associated cost for the expected unserved energy.

35. The system for quantifying an expected unserved energy of claim 33 wherein the computer processor is further configured for checking an accumulated number of operating hours for each energy generation resource and determining if the resource should be placed in a full outage or a partial outage condition.

36. The system for quantifying an expected unserved energy of claim 35 wherein the computer processor is further configured for comparing the accumulated number of operating hours and a randomly selected time to failure based on an actual time to failure data distribution for the resource.

37. The system for quantifying an expected unserved energy of claim 36 wherein the computer processor is further configured for determining if the resource in a full outage condition should be returned to an operational and committed status based on a randomly selected time to repair for the resource.

38. The system for quantifying an expected unserved energy of claim 35 wherein the computer processor is further configured for determining if the resource should be placed in a partial outage condition based on accumulated operating hours, a mean time to failure and a mean time to repair for the resource.

39. The system for quantifying an expected unserved energy of claim 38 wherein the computer processor is further configured for determining if the resource in a partial outage condition should be placed in a full outage condition based on accumulated operating hours.

40. The system for quantifying an expected unserved energy of claim 33 wherein the computer processor is further configured for determining a ratio of peak demand to available energy resource capacity and comparing the ratio against a threshold value.

41. The system for quantifying an expected unserved energy of claim 33 wherein the computer processor is further configured for dispatching the market purchase of energy based on a market price of energy, an available generating capacity and an available transmission capacity of a neighbor energy generation system.

42. The system for quantifying an expected unserved energy of claim 41 wherein the computer processor is further configured for estimating the market price of energy based on an expected energy reserve margin for a year and a magnitude of an hourly difference between energy load demand and available energy resources.

43. The system for quantifying an expected unserved energy of claim 33 wherein the computer processor is further configured for:
- determining a loss of load hours associated with the expected unserved energy;
- shedding the energy load demand for at least one residential customer if the loss of load hours is less than a specified value.

44. The system for quantifying an expected unserved energy of claim 33 wherein the computer processor is further configured for:
- determining a loss of load hours associated with the expected unserved energy;
- shedding the energy load demand for at least one commercial and industrial customer if the loss of load hours is equal to or greater than a specified value.

* * * * *